(12) United States Patent
Vannozzi, Sr.

(10) Patent No.: US 10,502,168 B2
(45) Date of Patent: Dec. 10, 2019

(54) GASOLINE VAPORIZATION SYSTEM AND METHODS FOR AN INTERNAL COMBUSTION ENGINE

(71) Applicant: Michael Antonio Vannozzi, Sr., Reno, NV (US)

(72) Inventor: Michael Antonio Vannozzi, Sr., Reno, NV (US)

( * ) Notice: Subject to any disclaimer, the term of this patent is extended or adjusted under 35 U.S.C. 154(b) by 213 days.

(21) Appl. No.: 15/844,517

(22) Filed: Dec. 15, 2017

(65) Prior Publication Data

US 2019/0186439 A1    Jun. 20, 2019

(51) Int. Cl.

| F02M 31/087 | (2006.01) |
| F02M 31/18 | (2006.01) |
| F02M 31/02 | (2019.01) |
| F02M 31/04 | (2006.01) |
| F02M 37/30 | (2019.01) |
| F02M 31/125 | (2006.01) |

(52) U.S. Cl.
CPC .......... *F02M 31/087* (2013.01); *F02M 31/02* (2013.01); *F02M 31/04* (2013.01); *F02M 31/18* (2013.01); *F02M 31/125* (2013.01); *F02M 37/30* (2019.01)

(58) Field of Classification Search
CPC ...... F02M 31/087; F02M 31/18; F02M 31/02; F02M 31/04; F02M 31/125; F02M 37/30
See application file for complete search history.

(56) References Cited

U.S. PATENT DOCUMENTS

| 4,644,925 A * | 2/1987 | Hoppie | F02M 27/02 |
| | | | 123/557 |
| 2002/0166545 A1* | 11/2002 | Stone | F01N 5/02 |
| | | | 123/527 |
| 2004/0237948 A1* | 12/2004 | Magyari | F02C 3/28 |
| | | | 123/557 |
| 2005/0279333 A1* | 12/2005 | Kweon | C01B 3/34 |
| | | | 123/557 |

* cited by examiner

*Primary Examiner* — Syed O Hasan

(57) ABSTRACT

The present invention provides a novel apparatus and method for the gasification of liquid petroleum fuel (gasoline), that has been atomized and emulsified with atmospheric air, by implementing a multi-Stage Heat Exchanger System.

8 Claims, 20 Drawing Sheets

GASOLINE VAPORIZATION SYSTEM AND METHODS FOR AN INTERNAL COMBUSTION ENGINE

BRIEF DESCRIPTION OF THE INVENTION

The invention relates to the field of gasification of liquid petroleum fuel, commonly known as gasoline, which has been atomized and emulsified with atmospheric air, for its intended use in internal combustion engine, most commonly employed in gasoline powered automobiles, and water craft.

The herein disclosed system provides a novel apparatus and method for the vaporization of liquid gasoline, which has been atomized and emulsified with atmospheric air, by implementing a multi-stage heat exchanger and compressor system, which in a preferred embodiment is a Three-Stage Heat Exchanger and Compressor System. The first stage employs a spigot mounted carburetor or an alternative fuel injection unit, positioned in a straight line laminar flow path, flowing into an exhaust gas heated Shell and Tube style heat exchanger unit. The atomized and emulsified liquid gasoline and atmospheric air mixture is immediately converted into a gaseous fuel vapor by phase change through application of uniform heat, obtained from the engine's exhaust system. Exhaust heat is applied to the air and gasoline mixture flowing through a metal tube structure inside of the Shell and Tube Heat Exchanger.

In the second stage, the already heated gasoline vapor mixture then flows into the attached compressor housing inlet of a Draw through Turbine Heat Exchanger Compressor component, which, through an impeller means, further heats and compresses the vaporous air and gasoline mixture. This process increases the density of the gaseous air and fuel mixture, which has been expanded and thinned out by heat, while simultaneously pressurizing the entire intake manifold tract.

The third stage, utilizes an Exhaust Gas Heat Exchanger Coil or alternatively, an Exhaust Gas Heat Exchanger Sphere, either of which are fitted internally within an open plenum style intake manifold. Hot exhaust gasses are ducted into and flow internally through the heat exchanger's tubular coils, or, alternatively, flow into the hollow metal sphere, thereby heating either unit. In both cases, the exhaust gas then exits back into the engine's exhaust system for exit to the ambient. The Heat Exchanger Coil, or the alternative Heat Exchanger Sphere, are positioned in close proximity to the intake manifold and cylinder head ports. The previously heated and compressed gaseous air and fuel vapor mixture flows into the intake manifold, then flows externally over and through gaps between the heat exchanger tubes, or, alternatively, over and under the Heat Exchanger Sphere. This contact further imparts a third stage continuation of heating to the previously heated and compressed gaseous air and fuel mixture. In addition, unique metal intake manifold gaskets are sandwiched between the cylinder head(s) and the metal intake manifold. Heat is transferred from the hot metal cylinder head(s), through the metal intake manifold gaskets, to the metal intake manifold, thereby heating the entire intake manifold through the principle of heat conduction. The combination of heating the exterior of the intake manifold, while simultaneously heating the interior of the intake manifold plenum, allows no reverse phase change or condensation of the air and gasoline vapor mixture to occur. The heated gaseous air and fuel vapor mixture then flows into the engine's valve controlled cylinder head intake ports, and into the engine's combustion chambers.

The engine's combustion chambers are also heated by the combustion process, thereby creating a fourth stage of further heating and maintaining the vaporous condition of the air and gasoline vapor mixture prior to spark plug ignition.

The heated air and fuel mixture is maintained in a dry homogenous condition throughout the entire intake manifold tract.

The entire flow path of atmospheric air and gasoline vapor mixture is consistently kept heated in a uniform manner after leaving the carburetor or fuel injection unit, until it enters the engine's combustion chamber. This eliminates any possibility of condensation of the gaseous gasoline vapor back into a liquid form. Conversely, the carburetor or optional fuel injection unit is kept isolated from engine heat by non-heat conductive elastomer tubular member(s), and thus remains cool, so as to prevent problems with vapor lock.

The intent of this invention is to greatly increase the efficiency, fuel mileage and power output, and also to significantly reduce automotive exhaust emissions from an internal combustion engine.

CROSS-REFERENCES TO RELATED APPLICATIONS

Not applicable.

STATEMENTS AS TO THE RIGHTS TO INVENTIONS MADE UNDER FEDERALLY SPONSORED RESEARCH OR DEVELOPMENT

Not applicable.

REFERENCE TO A "SEQUENCE LISTING," A TABLE, OR A COMPUTER PROGRAM LISTING APPENDIX SUBMITTED ON A COMPACT DISK

Not applicable.

BACKGROUND OF THE INVENTION

The inefficiency of modern internal combustion engines is well known by automotive engineers, mechanics, and those knowledgeable in the art. In fact, internal combustion engines rarely exceed 25% thermal efficiency. The majority of heat energy is lost through the engine's exhaust system, cooling system, frictional losses, and un-combusted, wasted fuel also known as hydrocarbons and carbon monoxide. Hydrocarbons and carbon monoxide are a considerable problem that contributes to air pollution and smog. The inefficiency of wasted fuel also comes at a considerable monetary expense to the public in lost potential gas mileage savings.

Whereas the modern automotive industry engineers and associated companies have elected to simply dispose of or manage an internal combustion engine's heat and hydrocarbons through computerized innovations, the present invention seeks to capture, channel and use the exhaust heat, by a mechanical method utilizing herein disclosed apparatus, to increase the thermo-efficiency of an internal combustion engine.

DETAILED DESCRIPTION OF THE INVENTION

Figure 1:
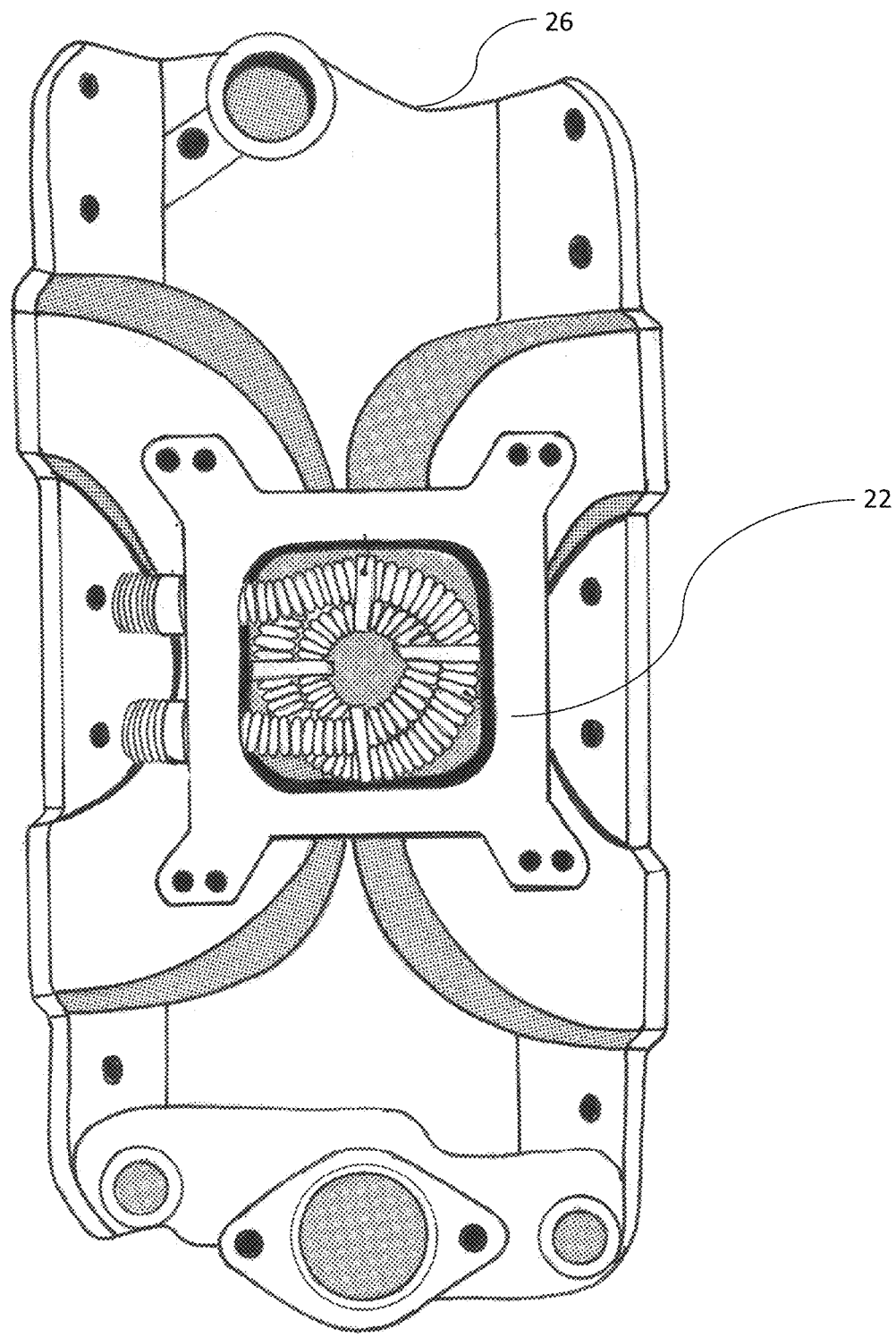
FIG. 1 illustrates an overhead view of an exemplary embodiment of an open plenum intake manifold with the Hot Coil Heat Exchanger installed in the open plenum, a component of an embodiment of the present invention.

The object of the invention is to substantially increase a gasoline powered vehicle's fuel mileage and horsepower output and greatly reduce its exhaust emissions by introducing a multi-stage apparatus and method for the gasification through application of wasted exhaust heat to liquid petroleum fuel (gasoline) that has been atomized and emulsified with atmospheric air. The multi-stage system, which may be a 3 Stage heat exchanger system, is safe, universal, adaptable, durable, heavy duty, easily cleanable, and may be retrofitted to a wide variety of currently available automobiles and watercraft. The system may include three different vaporizing apparatuses: a primary Shell and Tube style heat exchanger 32, a Draw Through Turbine Heat Exchanger compressor 300, and an Exhaust Gas Heat Exchanger Coil 22 or, alternatively a Heat Exchanger Sphere 200 (either of which may be referred to as an internal heat exchanger positioned within an intake manifold), either of which would be fitted internally into an open plenum intake manifold 26. The Open Plenum Intake manifold 26 also incorporates novel metallic intake manifold gaskets 400.

In all gasoline powered internal combustion engines, the liquid gasoline being used must be first atomized into a mist and emulsified with atmospheric air, then converted into a gaseous vapor through the application of heat, facilitating a Phase Change into a gaseous vapor in order to combust for its intended purpose to power a motor vehicle. In a typical production internal combustion engine, there are four principal reasons why gasoline in an un-combustible liquid state would flow into the engine's combustion chamber. The first reason is that insufficient heat has been applied to the air and gasoline mixture for full vaporization of the fuel mixture to occur. The second reason is that there is not enough time for the air and fuel mixture, which is flowing through the intake manifold tract at a high velocity, to absorb the heat that is being applied. The third reason is that the heated physical contact area is not large enough for complete exposure of the air and fuel mixture to completely vaporize. The fourth reason is the inadequate mixing of the air and gasoline does not produce a completely homogeneous fuel mixture.

The herein disclosed multi-stage Stage Gasoline Vapor System is able to maintain complete, uniform and consistent heating and gasification of the air and fuel mixture flowing throughout the entire intake manifold 26 tract, then through the valve controlled intake ports, and into the engine's combustion chamber. The herein disclosed system is also able to produce a substantially dry homogenous gasoline vapor and atmospheric air mixture that is metered to the changing requirements of an internal combustion engine in operation (at idle, passing on the freeway, climbing a hill, or towing, for example). The herein disclosed multi-stage Stage Heat Exchanger System is able to produce near instantaneous gasification of the air and fuel supply by employing the engine's exhaust heat to a high velocity, low restriction heat exchanger (shell and tube head exchanger 32 in the various Figures) designed that incorporates multiple high-speed spiral laminar flow path tubes 65 for exposing the air and fuel supply to a physically large area of heating.

This herein disclosed process facilitates the implementation of heating vortexes that heat the air and fuel vapor within the plurality of spirally corrugated tubes 65. This process creates a heated air and fuel mixture in a fully homogenous gaseous state for supplying to the engine's combustion chambers. Complete gasoline vaporization is advantageous for increasing the thermal efficiency of an internal combustion engine, which in turn increases an engine's horsepower output, fuel economy, and a reduction of automotive exhaust emissions. The herein disclosed apparatus for the multi-stage heat exchanger system has also been designed to be easily removable for internal cleaning. The relatively open ended and straight through shell and tube heat exchanger 32 design, compared to prior art heat exchanger designs, allows for easy physical internal access to clean out the primary heat exchanger's plurality of internal spiral corrugated tubes 65, with a rifle bore brush on a rod. This ability to easily clean out the heat exchangers 32 is advantageous because petroleum contaminants in modern gasoline fuel (including heavy olefins and paraffin's) can build up within the heat exchanger 32 to form a tar-like residue layer, which may inhibit or reduce the efficiency of the heat exchanger 32. The herein disclosed system also allows the engine to start easily, due to a strong vacuum signal from the engine in a direct linear pathway, with an unobstructed laminar flow path. The high speed gasification of the free flowing spiral laminar design of this invention is a vast improvement over many prior art gasoline vapor heat exchanger designs that utilized "Torturous" air and fuel pathways, multiple 90 degree turns, "Screened tubes" and/or "Heat Exchanger Brushes", for the air and fuel mixture to flow through. Previous and less efficient Torturous air and fuel pathways and other were used to slow down the flow of liquid gasoline and air mixture through those heat exchangers, in order to allow more time inside the heat exchanger unit for the liquid gasoline to convert to a gaseous form through exposure to heat.

Most standard factory internal combustion engines used in automobiles are only 15% to 25% thermally efficient in converting liquid gasoline and exhaust heat into horsepower and torque to propel the weight of a vehicle. A large percentage of the energy used by an automobile goes unconsumed by the internal combustion process, and is therefore wasted. Hydrocarbons, including the poisonous gas carbon monoxide, as well as VOCs (volatile organic compounds) and nitrogen oxides are partially converted into nitrogen, oxygen, carbon dioxide, and water vapor by the included catalytic converter system. In older pre-1975 vehicles, the air pollutants are simply dumped into the atmosphere as hydrocarbons or smog. Air pollution from cars comes from by-products of the combustion process (exhaust) and from evaporation of the fuel through exposure to atmospheric air. Gasoline is a mixture of hydrocarbons, compounds which contain hydrogen and carbon atoms.

The herein disclosed multi-stage heat exchanger vapor system (which in a preferred embodiment includes three stages), however, by allowing an internal combustion engine to consume nearly 100% of the fuel being used, will significantly reduce hydrocarbons emitted from an automobile's tail pipe. The significant increase in combustion efficiency requires that the carburetor 101 or fuel injection unit 10 (either of which may be referred to as an air and fuel introduction apparatus) be downsized by 50 to 75% over standard OEM size recommendations. The fact that gasoline is being more efficiently consumed allows the associated catalytic converter system to more completely clean the lesser quantity of polluted exhaust gasses, before they exit the tail pipe of the automobile. This has been verified by before and after testing, comparing smog test results from an automobile, utilizing the herein disclosed three-stage heat exchanger vapor system in comparison to previous smog test results, from the same test automobile in its standard factory configuration. In road testing of an automobile utilizing the herein disclosed three-stage heat exchanger vapor system, a typical Chevrolet 350 cubic inch V8 engine was also able to run satisfactorily, accelerate well to freeway speeds, and produce an abundance of power using only a single small (e.g. 200 cfm.) motorcycle-style carburetor (or a small motorcycle style throttle body type fuel injection system). Typically, the same 1970(s) Chevrolet 350 V8 used a factory "Rochester Quadrajet" carburetor with a 750 or 800 c.f.m. rating to introduce liquid gasoline and atmospheric air into the engine.

It is commonly known that liquids do not combust. In a gasoline powered internal combustion engine, the gasoline must be converted into a gaseous state in order to be consumed by the combustion process. In prior art systems, carbureted and fuel injected engines relied on physical contact of the heated areas in the bottom floor of the intake manifold, (the "heat riser Hot Spot system"), heat accumulated in the runners of the intake manifold, heat in the combustion chamber, hot intake and exhaust valves, and the hot top of the piston to only partially gasify the atomized air and gas mixture. The O.E.M. camshaft profile was also engineered to have overlap of the camshaft timing events. Engineered overlap means that at the end of the engine's exhaust stroke, when the piston is at or very near top dead center position, the exhaust valve is closing but is not fully closed yet, the intake valve then starts to open, allowing the air and fuel mixture to enter the combustion chamber. In this scenario, there is then residual hot exhaust gas and heat still in the combustion chamber that has not been totally evacuated. The Combustion chamber is extremely hot because it has just completed the combustion process of the power stroke. The incoming emulsified liquid gasoline and air charge mixes with the residual hot exhaust gas, and this mixing and exposure to combustion heat contributes to the vaporization of the atomized gasoline and air mixture. But this does not vaporize 100% of the atomized gasoline and air mixture. Therefore, some of the liquid gasoline falls out of suspension, forming droplets that pool together (condense) and remain un-combusted, and mixes with residual carbon from the combustion process. This un-combusted liquid gasoline and carbon mixture, defined as hydrocarbons, is what causes smog in the air, and what turns the engine's motor oil black. The unburned condensed liquid gasoline, mixed with carbon is then pushed into the engine's crankcase, through the piston ring gap, by cylinder pressure, and thereby mixes with the engine's motor oil. Carbon from the combustion process is a crystalline substance which mixes with the engine's lubricating oil, and acts as an abrasive on the engine's internal moving parts, causing premature wear of the engine's internal components. As stated previously, liquids do not combust, and therefore gasoline does not combust in liquid form, but must be turned into a gaseous state by a phase change through heat evaporation to combust, and oxygen must be present. An Internal Combustion Engine rotating at high operating speeds dictates an extremely limited time period for any residual liquid gasoline that has been drawn into the combustion chamber by engine vacuum to be converted to a gaseous state by heat in the combustion chambers prior to the start of the exhaust stroke. There is simply not enough time, in the milliseconds it takes for the piston to move downwards 3 to 4 inches on the power stroke at any engine speed, to convert any residual liquid gasoline that has fallen out of suspension into a gaseous vapor inside of the combustion chamber. The only solution to the problem is to convert 100% of the liquid gasoline and atmospheric air mixture into a gaseous vapor first, prior to it entering the engine's combustion chamber.

The herein disclosed multi-stage stage heat exchanger system is designed to be used in high performance and or high-altitude applications, and is considered to be a "Supercharged" system. The system is designed to maximize horsepower, torque and thermo-efficiency and fuel mileage of an internal combustion engine.

The herein disclosed three-stage gasoline vaporization system may utilize a variable Venturi carburetor component. In a preferred embodiment, the carburetor is a spigot mount side draft, single orifice design that is typically used in motorcycle applications. The carburetor's side draft design allows a substantially straight through pathway for the atmospheric air and liquid gasoline mixture to travel prior to being drawn into the Shell and Tube Heat Exchanger 32 by engine vacuum. The carburetor features an internal sliding door mechanism, called a "Slide" that opens through the center of the carburetor body, and is attached to a throttle cable that is connected to the vehicle's accelerator pedal. At the bottom of the slide is located an attached tapered needle and seat jet valve assembly. As the carburetor Slide is opened by the throttle cable, the primary air inlet orifice progressively becomes larger, while simultaneously the tapered needle jet is pulled upward from its surrounding port, which gradually increases the admittance of liquid atomized gasoline and ambient air to flow through the carburetor's "Venturi" for high velocity emulsification. The carburetor's Slide mechanism strictly controls the amount of atmospheric air and atomized liquid gasoline that can enter into the primary Shell and Tube Heat Exchanger 32. Thorough atomization of the liquid gasoline is imperative because it breaks up the liquid into tiny microscopic droplets and then emulsifies the droplets with atmospheric air at a high vacuum velocity. Complete atomization of the gasoline into microscopic droplets is crucial when the gasoline mixture is flowing through the primary high temperature Shell and Tube heat exchanger 32 because the volume of microscopic gasoline droplets can flow through the multiplicity of heat exchanger tubes 65 and establish intimate contact to a greater heated surface area for a given amount of discharged atomized liquid fuel. Thus, there is a greater exposure to heat facilitating the immediate phase change of the liquid gasoline and atmospheric air mixture converting them into a homogenous gasoline vapor and air mixture. It must be understood that atomized liquid gasoline that has been emulsified with atmospheric air is still in liquid form. Liquid gasoline does not become a gaseous vapor until application of sufficient heat so that a phase change can occur. The Variable Venturi carburetor also utilizes an accelerator pump mechanism which facilitates initial priming and cold starting of the internal combustion engine. Initially, at cold start up, liquid gasoline is injected into the carburetor's Venturi flow tube, and is quickly drawn into the heat exchanger 32 and engine by strong engine vacuum. This extra amount of gasoline injection creates fuel enrichment, prior to the Shell and Tube heat exchanger 32 becoming fully heated by the engine's exhaust gasses and the heat exchanger reaching complete temperature equilibrium. This process, along with the carburetor's choke mechanism, facilitates easy cold starting of the internal combustion engine.

Figure 6:
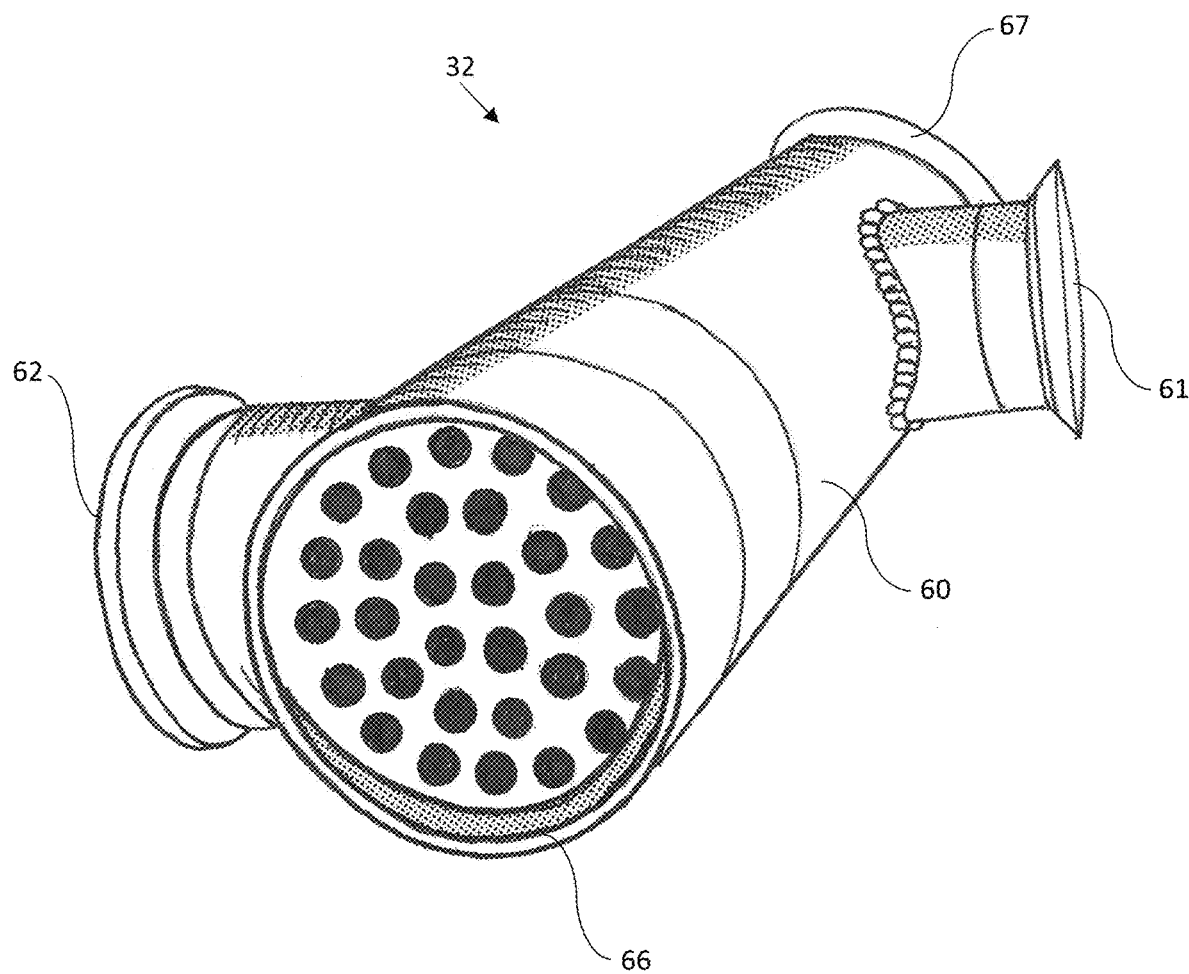
FIG. 6 illustrates an end view of an exemplary embodiment of the Shell and Tube style heat exchanger, a component of an embodiment of the present invention, showing its open-ended design, and a view of the plurality of port openings of the spirally corrugated heat exchanger tubes.
Figure 6A:
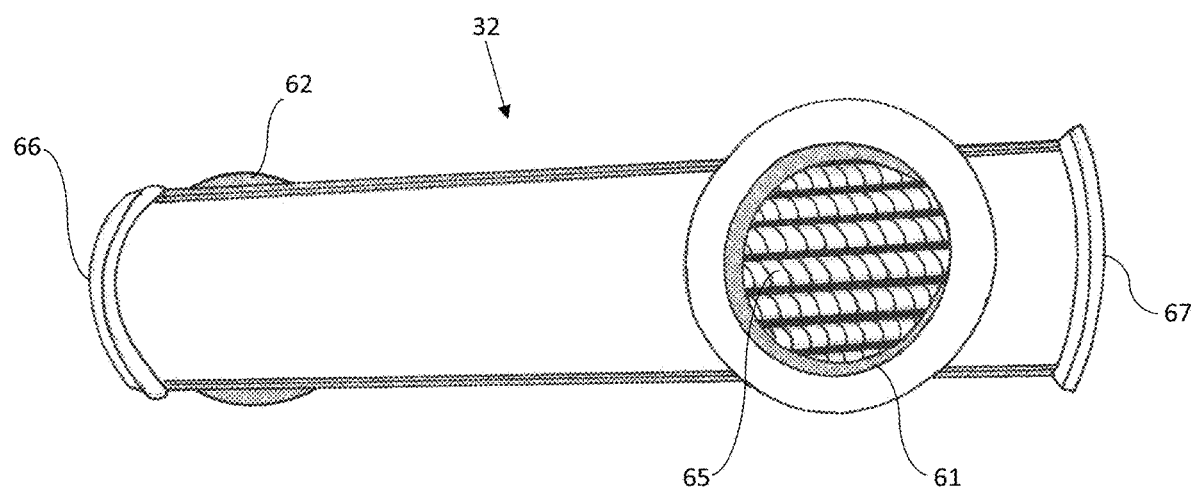
FIG. 6a illustrates is a side view of an exemplary embodiment of the Shell and Tube style heat exchanger, a component of an embodiment of the present invention, with a view looking through an exhaust side port at the plurality of spirally corrugated heat exchanger tubes.
Figure 6B:
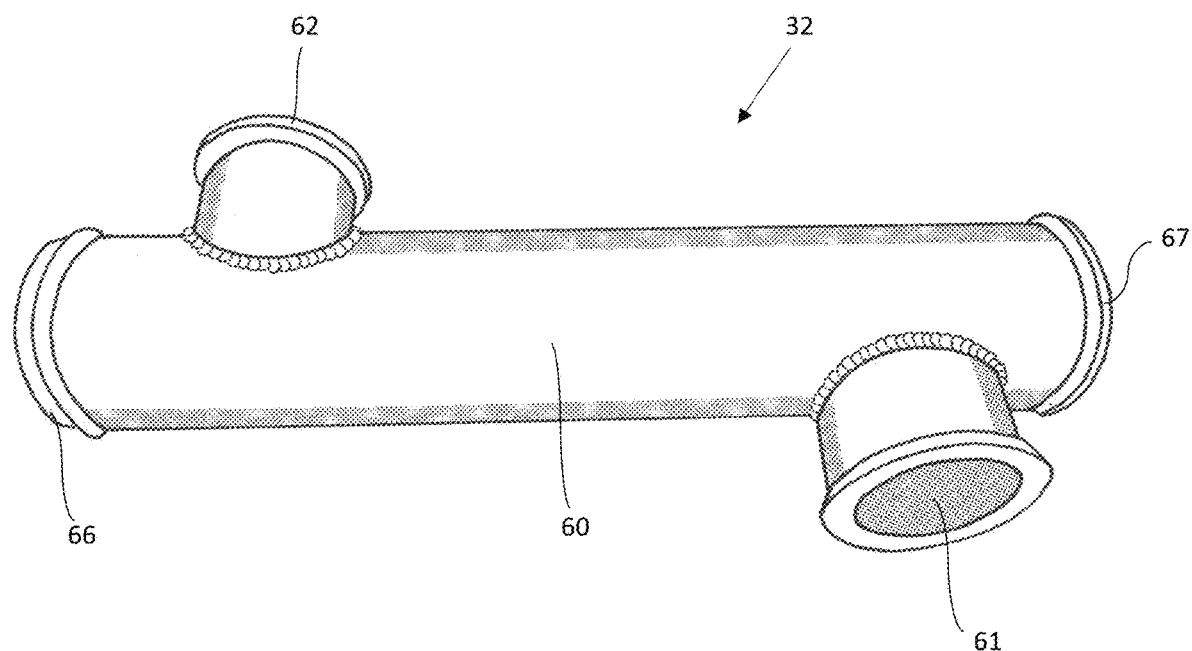
FIG. 6b illustrates an overhead view of an alternative embodiment of the Shell and Tube style heat exchanger, a component of an embodiment of the present invention, with the exhaust gas ports positioned on opposite sides.
Figure 6C:
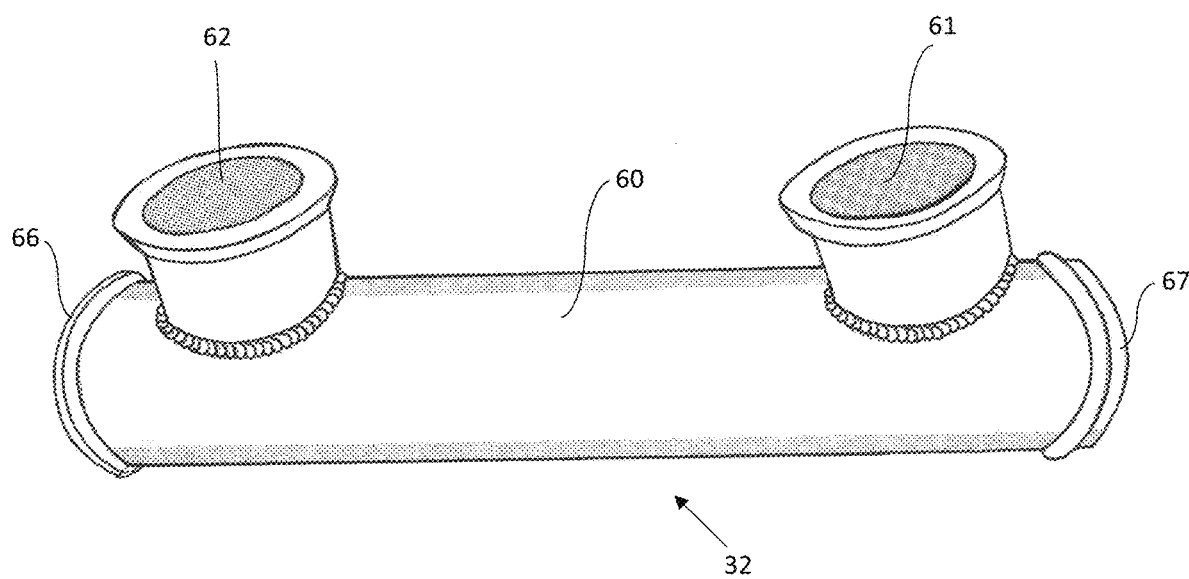
FIG. 6c illustrates an overhead view of an alternative embodiment of the Shell and Tube style heat exchanger, a component of an embodiment of the present invention, with the exhaust gas ports positioned on the same side.
Figure 7:
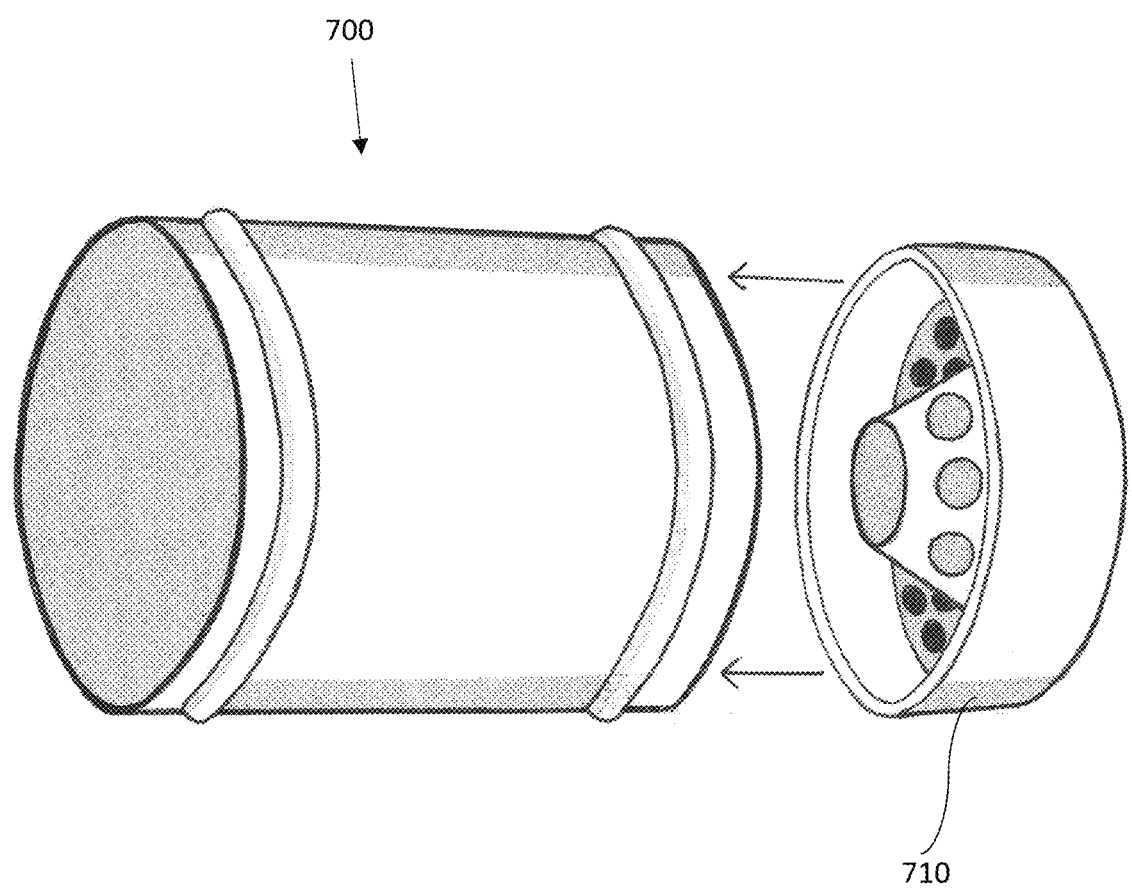
FIG. 7 illustrates a side view of an exemplary embodiment of the Diffuser Chamber and the Cone Diffuser assembly, components of an embodiment of the present invention.
Figure 8:
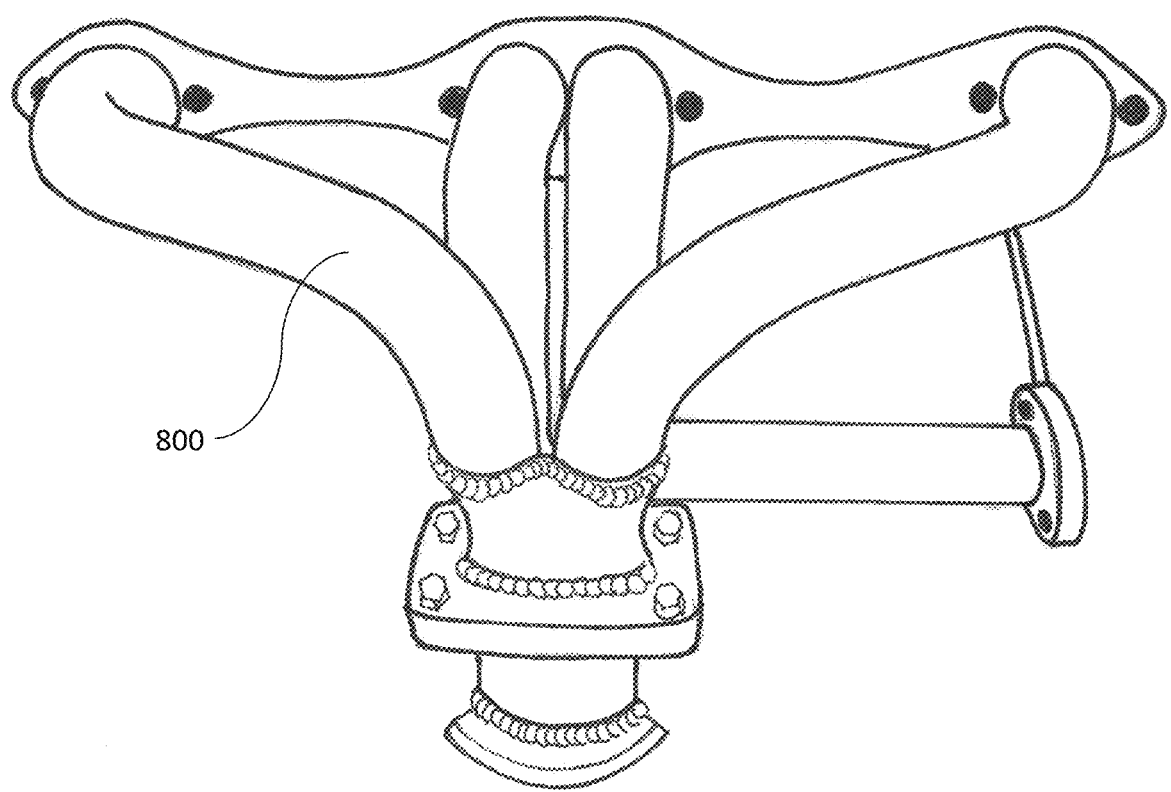
FIG. 8 illustrates an exemplary embodiment of a connection between the draw through turbine heat exchanger compressor and the intake manifold, a component of an embodiment of the present invention.
Figure 9:
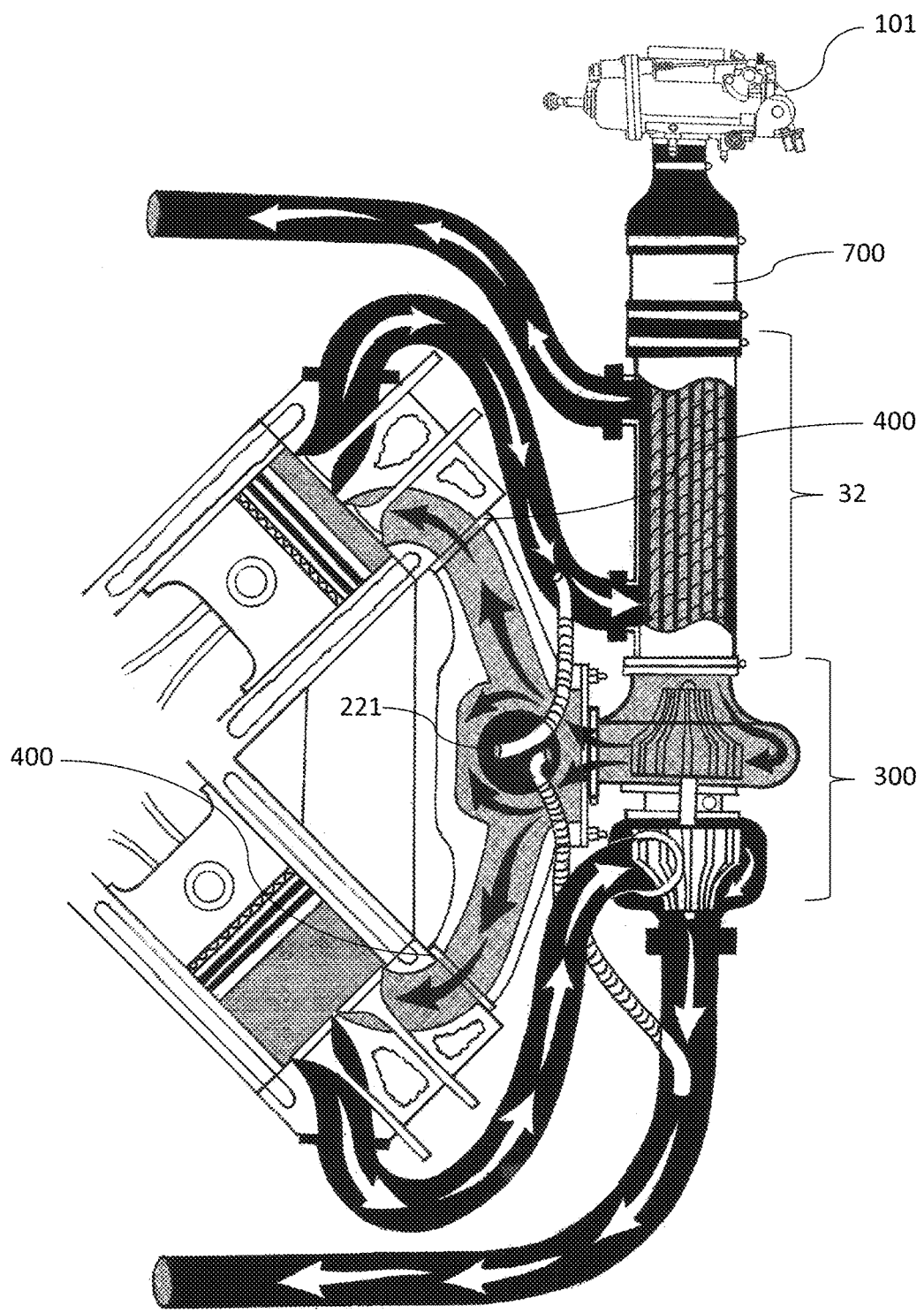
FIG. 9 illustrates a flow diagram for an exemplary embodiment of the herein disclosed gasoline vaporization system.
Figure 10:
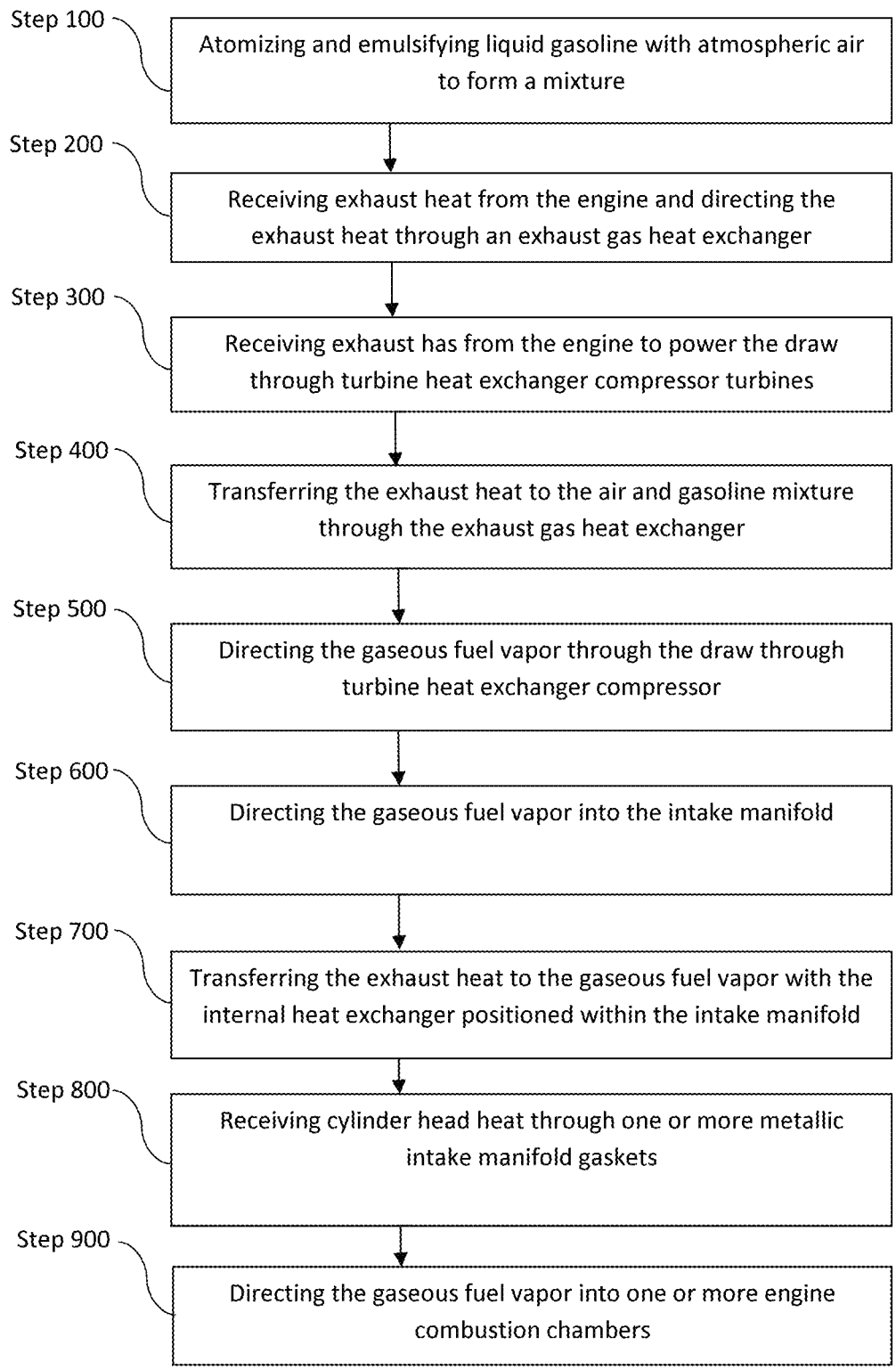
FIG. 10 illustrates a flow diagram for an exemplary embodiment of the herein disclosed methods for providing fuel to an engine in a vaporized condition.

The herein disclosed three-stage gasoline vaporization system includes a shell and tube heat exchanger component. The Shell and Tube Heat Exchanger component 32 may be formed of heavy duty stainless steel for durability and resistance to metal fatigue caused by hot and cold heat cycles. Those skilled in the art will recognize that stainless steel, once heated, retains heat and stays uniformly hot and resists corrosion and is thus a preferred material for forming the shell and tube heat exchanger; but those skilled in the art will recognize that other materials may provide similar heat retention properties and may be advantageously utilized to form the herein disclosed shell and tube heat exchanger, and all such materials are intended to be included herein. As illustrated in FIG. 6 through FIG. 6c, shell and tube heat exchanger component 32 includes an elongated metal case 60 having a plurality of relatively small diameter, spirally corrugated straight metal tubes 65 (see FIG. 6a). In a preferred embodiment, the spirally corrugated straight metal tubes are oriented length wise inside elongated metal case 60, which may be referred to as a metal shell or a case enclosure, having first end 66 and second end 67, as seen in FIG. 6a. The spirally corrugated metal tubes 65 are separated, in a side by side arrangement, and may be uniformly spaced in relatively close proximity to each other. The first end 66 and the second end 67 of the external metal case 60 may be welded and sealed closed only leaving open the ends of the spirally corrugated metal tubes 65 which are intended to be open to a substantially straight through center laminar flow path for the air and fuel mixture to travel. The Air and Fuel mixture flows through and simultaneously spins within each of the plurality of tubes creating multiple vortexes which thoroughly mixes and uniformly heats the air and fuel mixture at a high velocity. The welded and sealed first end 66 and second end 67 of the external metal case 60 also create a secondary internal chamber, which encloses the spirally corrugated tubes 65 within the external metal case, as seen in FIG. 6a. On the outer side(s) of the metal case 60, and on opposite ends, inlet port 61 and outlet port 62 are formed, and diagonal oriented pipes with flanges are welded on to the exterior of the metal case 60, representing exhaust gas inlet port 61 and outlet port 62 on the side(s) of shell and tube heat exchanger 32. Referring to FIGS. 6b and 6c. The inlet port 61 and outlet port 62 can be positioned on the same or opposite side of elongated metal case 60, depending on requirement for chassis fitment. The inlet port 61 and outlet port 62 (the inlet/outlet ports may be referred to as inlet/outlet pipes) allow access through the sides of metal case 60 to the inner chamber where the exterior sides of spiral corrugated tubes 65 are located (see FIG. 6a). This configuration creates an ingress and egress for a secondary internal flow pathway where hot exhaust gas from the engine may enter into the enclosed chamber. Hot engine exhaust gasses flow into the side at inlet port 61, on one end of the Shell and Tube Heat Exchanger 32, then the hot exhaust gas flows over and in-between the spiral corrugated metal tubes 65 (located inside the enclosed chamber 60), and then exits at the opposite end of the heat exchanger case 60 at outlet port 62, and are ducted into the outgoing exhaust system. There are two completely separated and sealed flow paths in the design, one for the emulsified ambient air and fuel mixture to flow through the center of the shell and tube heat exchanger 32, inside of the spiral corrugated tubes 65, and a second flow path for the hot exhaust gases, to flow within the enclosed case chamber 60, over and in between the exterior of spiral corrugated heat exchanger tubes 65. No physical contact is ever made between the hot exhaust gasses and the gasoline and air mixture, as both substances are kept apart from each other in two separate metal compartments. The transfer of exhaust heat to the spirally flowing air and fuel mixture is accomplished by the principal of heat conduction. Conversely, the cool air and fuel mixture from the carburetor or fuel injection unit counteracts the exhaust heat through an evaporative cooling effect from emulsification. The cool liquid gasoline and atmospheric air mixture flowing through the inner center flow path of the tubes mediates the exhaust heat radiating through the tubes. For example, consider that an exhaust temperature entering the shell and tube heat exchanger 32 may reach approximately 400 to 500 degrees Fahrenheit. After the evaporative cooling effect from the center flowing air and fuel mixture, the heat exchanger system will reach temperature equilibrium. Then the heated air and fuel mixture temperature may end up being approximately 225 to 300 degrees Fahrenheit. The target temperature of the disclosed Gasoline Vapor systems, described herein, for the vaporization by heat of atmospheric air and fuel mixtures is 250-275 degrees Fahrenheit. Gasoline is a mixture that is composed of a variety of ingredients that vaporize at different temperatures. The majority of gasoline components vaporize at temperatures of 80 to 250 degrees Fahrenheit. The slower vaporizing ingredients vaporize from 250 to 437 degrees Fahrenheit. Complete vaporization (100%) of liquid gasoline occurs by 437 degrees Fahrenheit. Spontaneous combustion of gasoline from the application of heat occurs at 495 to 536 degrees Fahrenheit, (depending on the gasoline formulation). It must be understood that these commonly accepted vaporization temperatures are for liquid gasoline only, and do not apply to an emulsified air and gasoline mixture.

The Multiple Vortex Effect.

Utilizing the force of Engine and turbine vacuum, the emulsified Air and gasoline mixture is drawn into the Heat Exchanger 32 (the herein disclosed shell and tube heat exchanger 32 may be referred to as a heat exchanger). When flowing through the Heat Exchanger, the air and gasoline mixture is heated and simultaneously spins within each of the plurality of small diameter, spirally corrugated tubes 65. This creates multiple Vortexes which thoroughly mix and uniformly heats the spinning air and fuel mixture flowing through at a high velocity. For example, if thirty spirally corrugated tubes are contained within the Shell and Tube Heat Exchanger 32, there will then be thirty separate vortexes of a spinning and emulsified air and gasoline mixture, which is uniformly being heated and converted into gasoline vapor, while flowing internally through the heat exchanger tubes.

Sizing Requirements.

Utilizing an appropriate size of primary Shell and Tube Heat Exchanger 32 is also an important factor. A large cubic inch V8 engine for example, will require a larger quantity of air and gasoline vapor mixture to operate properly as opposed to a smaller cubic inch 4 cylinder engine. A larger diameter Shell and Tube Heat Exchanger 32 will accommodate a larger plurality of spirally corrugated Heat Exchanger Tubes 65, and a larger heated contact area. For example, a 454 cubic inch "Big Block" V8 engine may require approximately 40 small diameter heat exchanger tubes to thoroughly heat the quantity of air and gasoline vapor mixture that is required to operate that large size engine efficiently, throughout the engines operating range of 1000 to 6000 revolutions per minute. A "Small Block" 350 cubic inch V8 engine may require 30 internal Heat Exchanger Tubes. A six cylinder 200 to 300 cubic engine may require 25 internal heat exchanger tubes, and a 100 to 150 cubic inch four cylinder engine may require 20 internal Heat Exchanger Tubes. The length of Shell and Tube Heat Exchanger 32 should also be appropriately sized to allow adequate flow through time for the emulsified air and gasoline mixture to be completely vaporized. As a point of reference and, through testing, a preferred embodiment includes a primary heat exchanger length of approximately 14 inches, completely vaporizing the emulsified air and gasoline mixture, throughout the operating range of 1000 to 6000 revolutions per minute, on a small block 350 cubic inch V8 engine.

When atomized gasoline is mixed with atmospheric air (oxygenation) and thoroughly emulsified into a homogenous mixture, and then compressed, the required vaporization temperature by the application of heat is much lower than that of liquid gasoline alone. For complete vaporization, it is not necessary to heat the Atmospheric Air and Gasoline mixture to its full liquid vaporization temperature of 392 to 437 degrees Fahrenheit. Complete pre-heating of the air and gasoline mixture to 250-325 degrees Fahrenheit, when flowing through the intake manifold tract, allows an engine to run and perform satisfactorily and efficiently. Further heating of the pre-vaporized air and gasoline mixture will also occur when the mixture enters the hot combustion chamber, which will have a surface temperature that can exceed 600 degrees Fahrenheit from the cylinder's previous combustion process. I have also found that an internal combustion engine can run and perform well on an air and gasoline vapor mixture that is leaner than "Stoich" (14.7:1), where the air and fuel mixture is maintained at a ratio no leaner than 16:1.

Draw Through Turbine Heat Exchanger Compressor Component

Figure 3A:
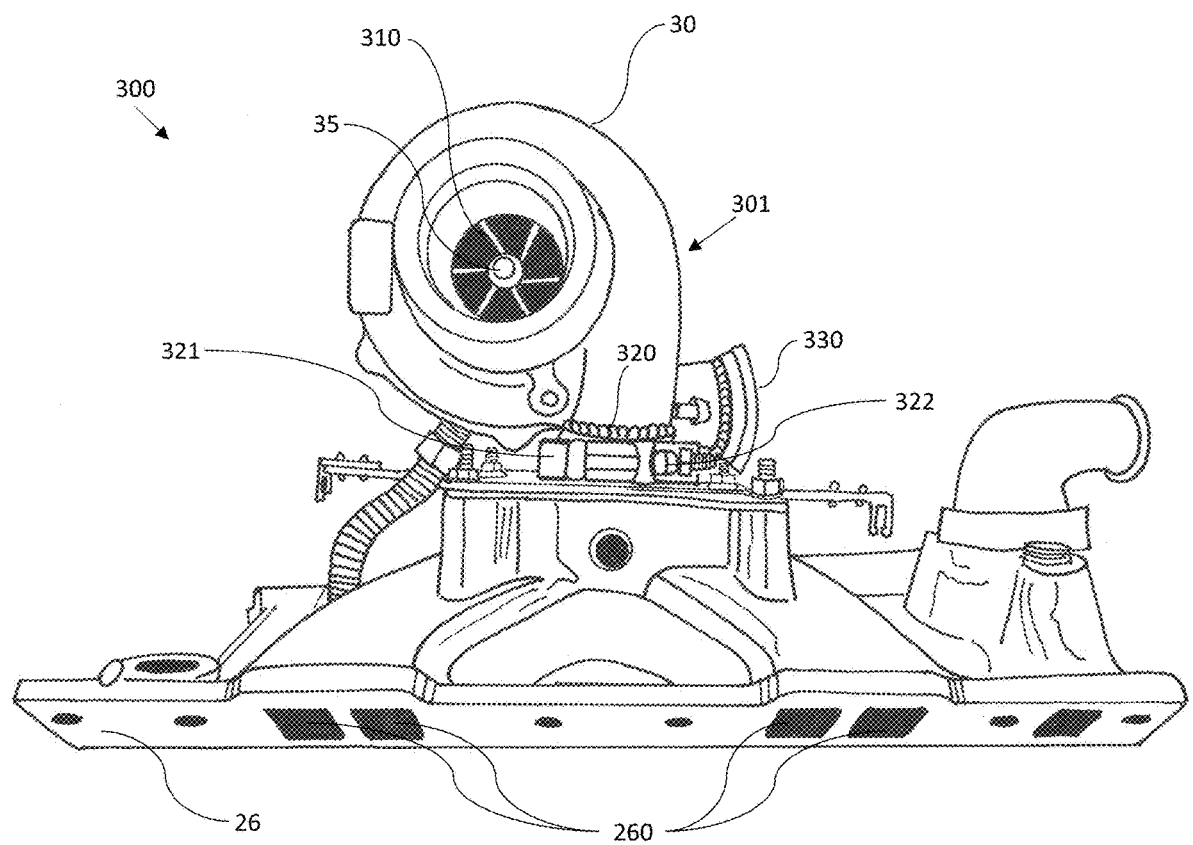
FIG. 3a illustrates a compressor side view of a draw through turbine heat exchanger compressor, a component of an embodiment of the present invention.
Figure 3B:
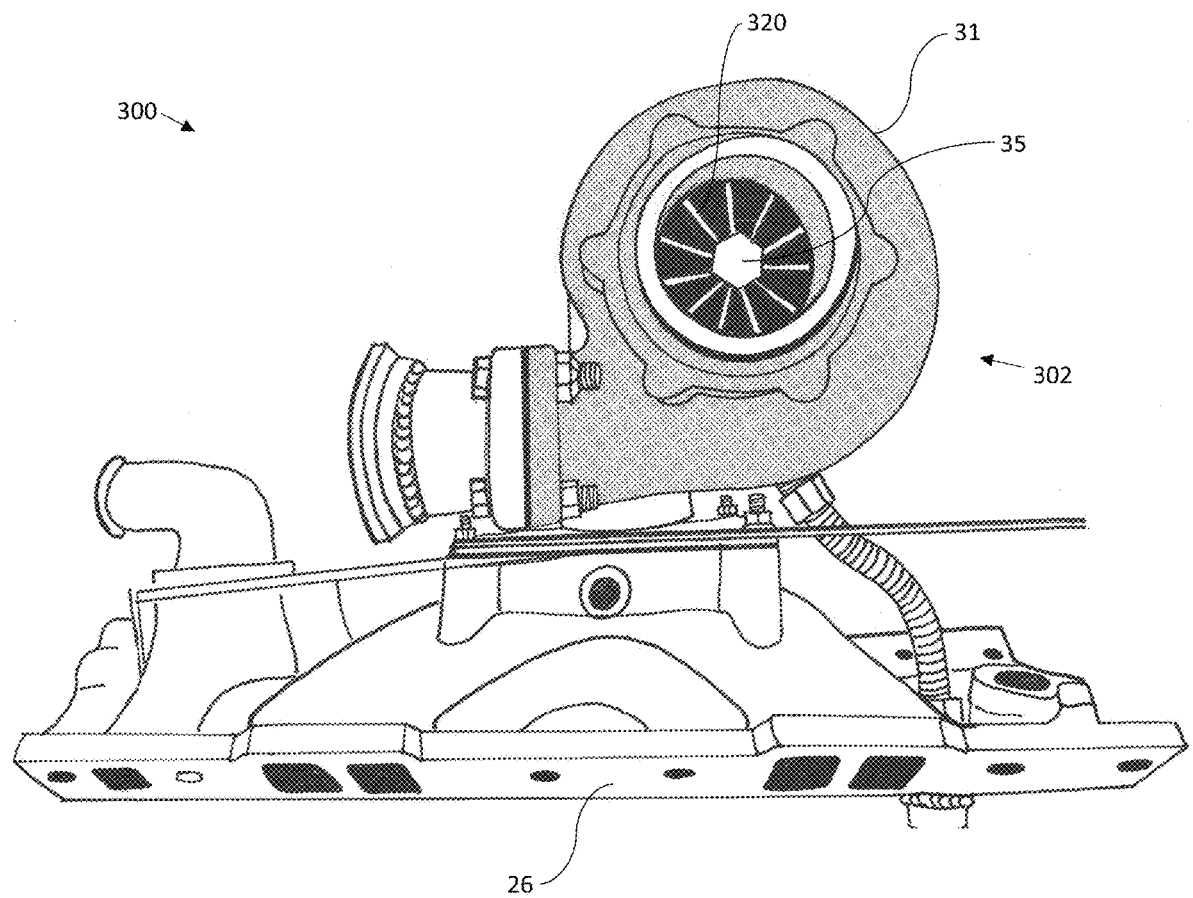
FIG. 3b illustrates an exhaust turbine side view of a draw through turbine heat exchanger compressor, a component of an embodiment of the present invention.
Figure 5:
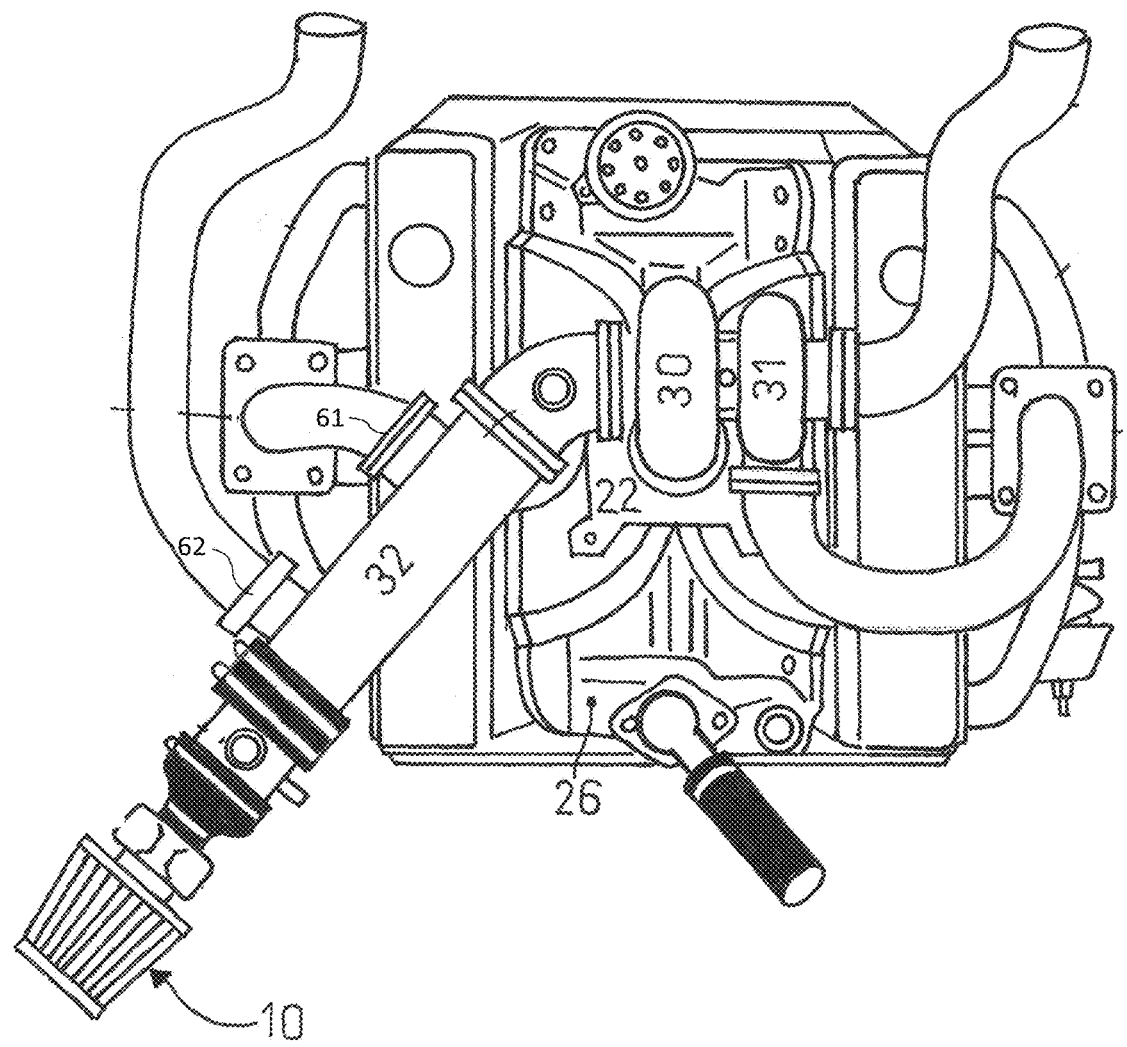
FIG. 5 illustrates an overhead view of an exemplary embodiment of the complete heat exchanger system mounted on a modern V8 engine, a component of an embodiment of the present invention.
Figure 5A:
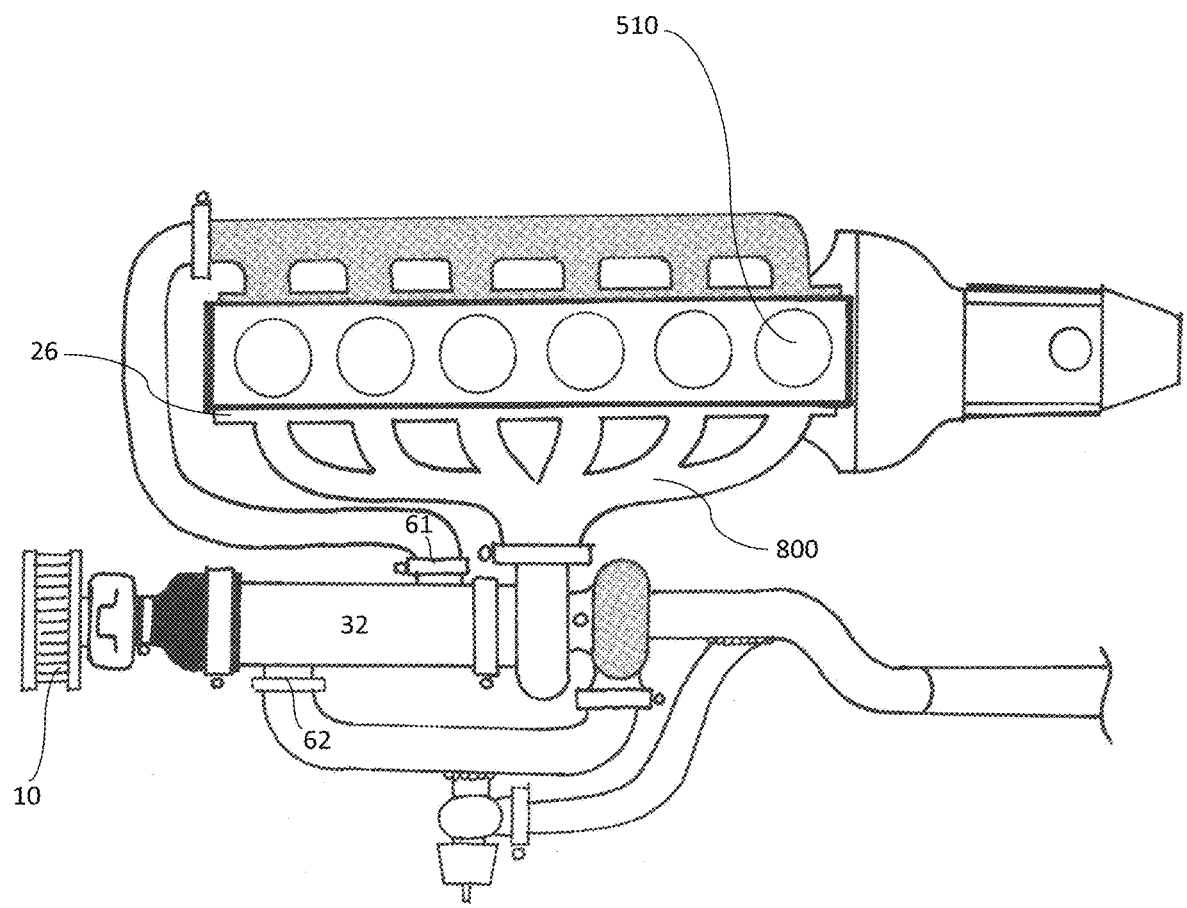
FIG. 5a illustrates an overhead view of an exemplary embodiment of the complete heat exchanger system mounted on a modern Inline 6 cylinder engine, a component of an embodiment of the present invention.
Figure 5B:
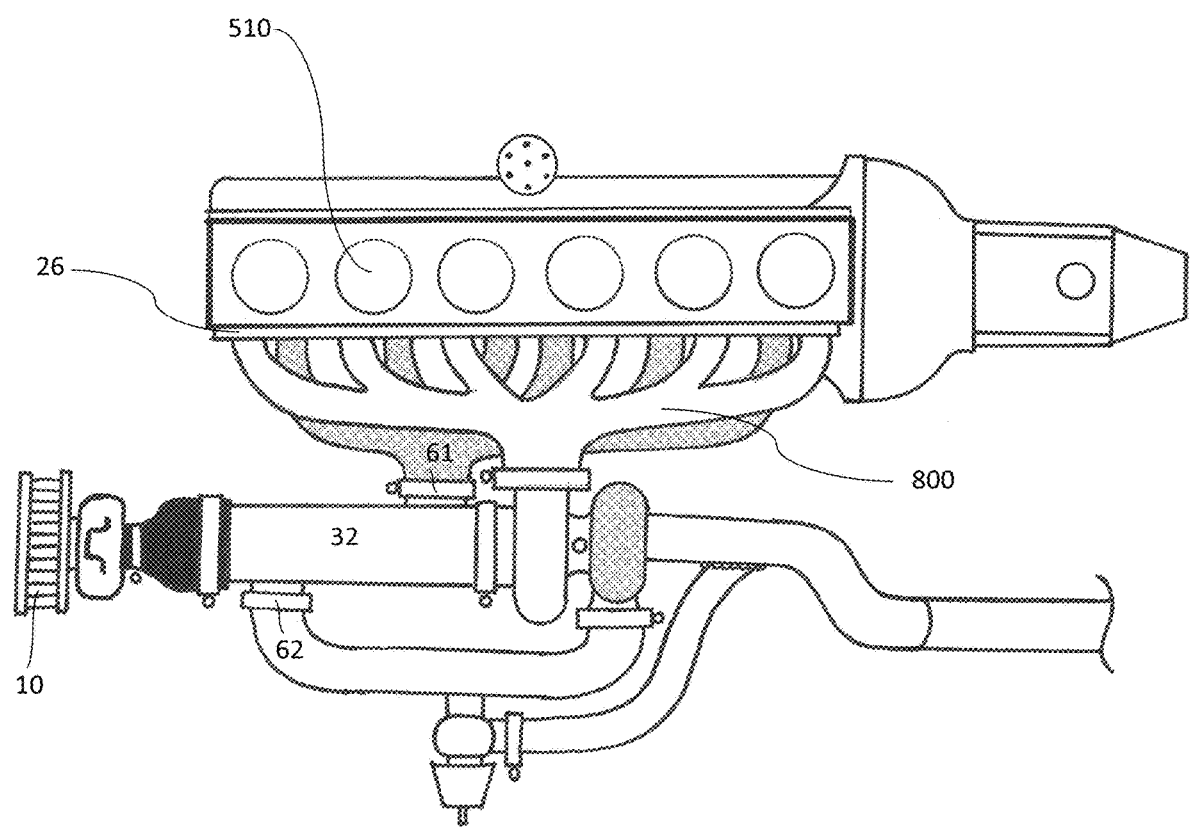
FIG. 5b illustrates an overhead view of an exemplary embodiment of the complete heat exchanger system mounted on an alternative Inline 6 cylinder engine, a component of an embodiment of the present invention.
Figure 5C:
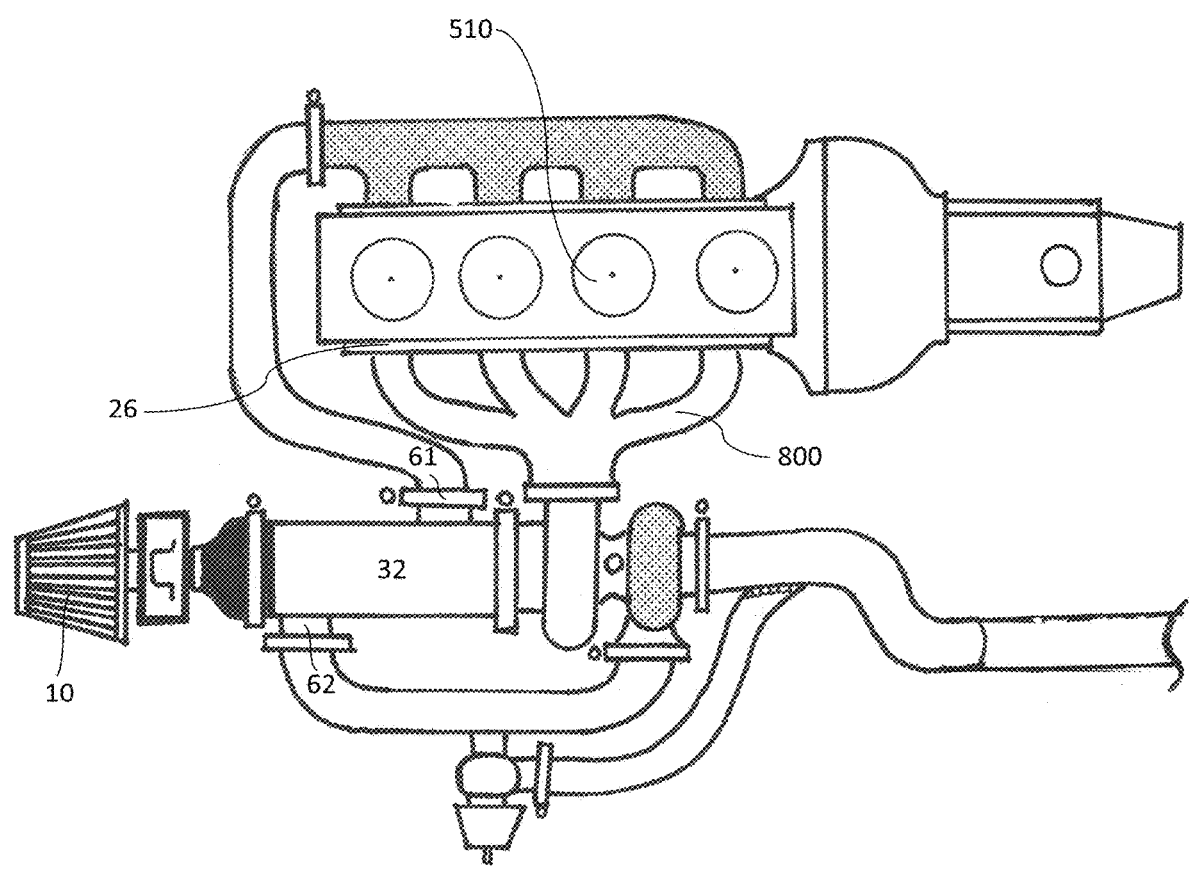
FIG. 5c illustrates an overhead view of an exemplary embodiment of the complete heat exchanger system mounted on a modern Inline 4 cylinder engine, a component of an embodiment of the present invention.
Figure 5D:
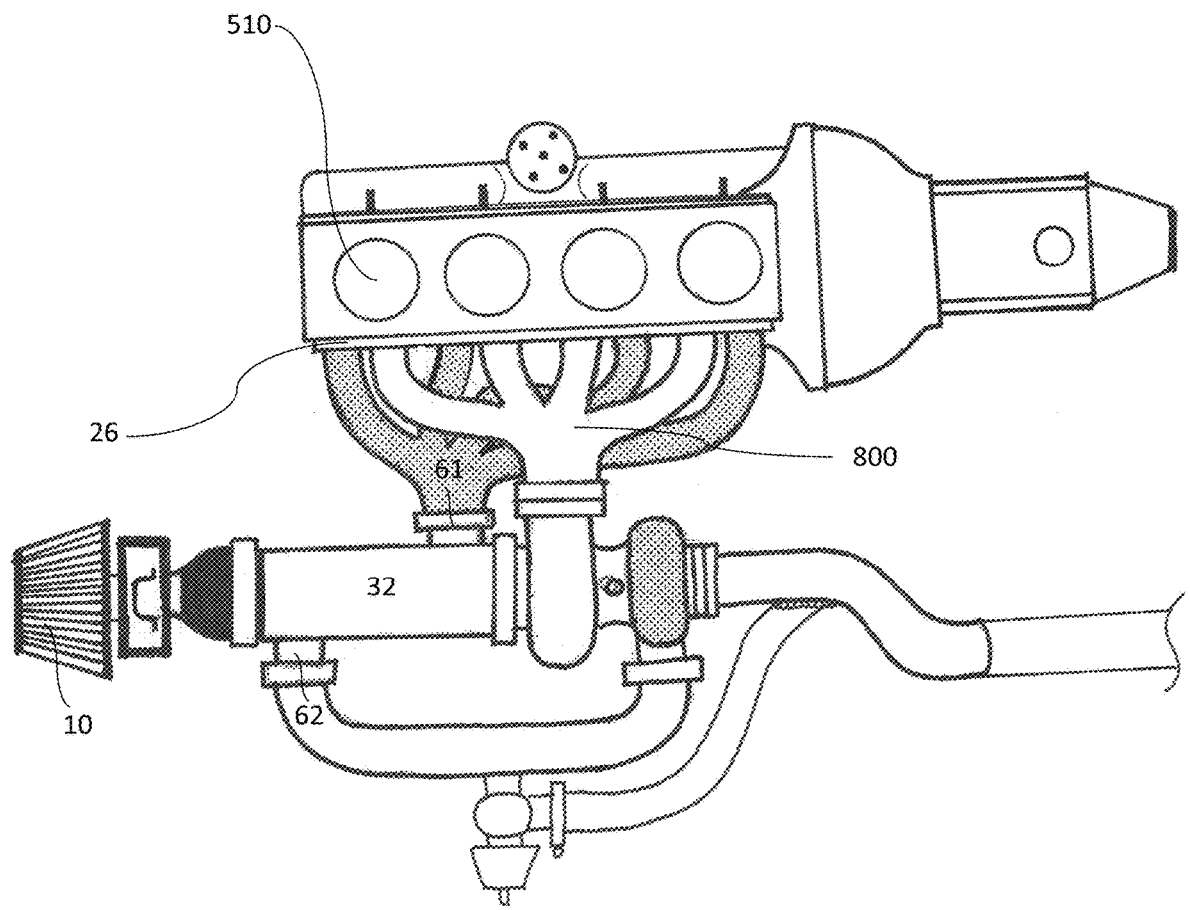
FIG. 5d illustrates an overhead view of an exemplary embodiment of the complete heat exchanger system mounted on an alternative inline 4 cylinder engine, a component of an embodiment of the present invention.

The 3 Stage system also incorporates a Draw Through Turbine Heat Exchanger Compressor component 300 (see FIG. 3a and FIG. 3b), which is strategically positioned in between the Shell and Tube heat exchanger 32 and the Internal Intake Manifold Heat Exchanger Coil 22 (or alternatively, the Internal Heat Exchanger Sphere). The Draw-Through Turbine Heat Exchanger Compressor component 300 comprises a duality of turbine impellers, mounted on opposite ends of a shared drive shaft 35. The two turbine impellers are each are positioned, in their own separate scroll shaped housings on opposing sides of the shared drive shaft 35. One side resides within aluminum turbine compressor housing 30 and the opposite side within a cast iron exhaust turbine housing 31. A pressurized engine oil lubricated bearing and seal assembly 39 (see FIG. 5) is centrally positioned in between, connecting the two turbine housings and turbines. Exhaust gasses are discharged from the internal combustion engine's combustion chamber exhaust port into an exhaust manifold header. The exhaust manifold header, and associated connecting inlet pipes then transfer hot exhaust gasses to the exhaust turbine housing 31. The exhaust side turbine impeller 320 is positioned in the exhaust flow path, inside the scroll shaped exhaust housing 31. In this configuration, hot exhaust gasses expand against the outer perimeter of the exhaust turbine's spiral shaped impeller blades within the scroll shaped exhaust housing 31. The hot exhaust gas expansion exerts directional pressure onto the sides of the impeller blades 31. This facilitates the conversion of heat energy through hot exhaust gas expansion into rotational mechanical energy, which spins the turbine at a high velocity. The exhaust gasses then flow inwards through the spiral crevasses between the turbine blades, exiting the exhaust housing 31 through an exhaust port located in the center of the exhaust housing 31, and then out through the exhaust pipe. The shared turbine shaft 35 then transfers the mechanical rotational forces from the exhaust turbine 302 to the compressor turbine 301 on the opposing side of the shared drive shaft 35. This allows for the high-speed rotation of the compressor side turbine impeller 310 within its own separate scroll shaped compressor housing 30. A centrally positioned inlet orifice allows for the induction of the heated vaporized air and fuel mixture into the compressor housing 30. The impeller blades rotationally cut and segment the incoming gaseous vapor intake charge at a high rate of speed, and, through inertia, throw the air and gasoline vapor mixture from the center inlet outwards at a great velocity, flowing against the inside of the compressor housings 30 scroll shape, allowing no reverse movement, and thereby pushing the hot gaseous vapor forward under pressure, out through the compressor nozzle. The gap tolerances between the compressor turbine impeller blades 310 and the compressor housing 30 are very small, allowing no significant gap for any gaseous vapor to escape the confines of the housing. The high speed rotational flow of the compressor turbine's impeller 310 also creates its own vacuum, facilitating the induction of the heated gaseous air and fuel mixture from the Shell and Tube heat exchanger 32, and also preventing any gaseous vapor from escaping through the compressor housing 30. The Shell and Tube style Heat Exchanger System 32 introduces a homogenized gasoline and atmospheric air mixture in a completely gaseous state into the compressor housing 30 of the Draw through Turbine Heat Exchanger Compressor 300. The exhaust heated gasoline vapor and atmospheric air mixture, in a completely dry gaseous form, first flows through the center of the Shell and Tube style heat exchanger 32, and then into the inlet on the compressor side (compressor turbine 301) of the Turbine Heat Exchanger Compressor 300. The heated gasoline vapor, in gaseous form flows through the compressor turbine 301, and is compressed, thereby pressurizing the entire intake manifold tract with a hot gasoline vapor and air mixture. As previously stated, a liquid cannot be compressed, and to introduce too much liquid gasoline into the compressor housing 30, even in atomized form, could cause damage to the bearing and rotating assembly of the Draw through Turbine Heat Exchanger Compressor 300. Although the associated illustrations resemble a standard Turbocharger, this unit is not a typical turbocharger. A typical Turbocharged system allows the Turbocharger to induct only filtered atmospheric air, from the ambient, compressing only that air; then, after the air is compressed, after the turbocharger, liquid petroleum fuel is introduced through a fuel introduction means (carburetor or fuel injection,) thereby pressurizing the Intake manifold tract, the cylinder head intake ports, and finally the valve controlled combustion chambers. As you will note, there is no liquid petroleum fuel introduced into the Turbocharger's compressor housing 30. The reason for this is quite obvious: to introduce a liquid into the compressor housing 30, even when in atomized form and emulsified with air, and then into the compressor turbine 301, severely inhibits or bogs down the high speed rotational function of the turbocharger. Draw-Through Turbocharger systems have been tried and used in the past, but, because of the liquid induction issue, the Blow-through Turbocharger systems became significantly more prevalent. The Draw through turbine heat exchanger 300 can spin at speeds exceeding 100,000 rotations per minute (rpm), and employs a highly balanced rotating assembly. If an excess amount of "liquid gasoline" were sucked into the compressor housing 30 and into the crevasses of the blades in the compressor assembly, the turbine could be thrown out of balance and or even "hydro-lock", which could damage and or even destroy the turbine and the bearing assembly. This is why it is imperative to completely gasify the air and fuel mixture first, prior to being inducted into the compressor turbine assembly 301.

The herein disclosed gasoline vaporization system for a combustion engine is laid out in the following linear progression: 1) Air Cleaner, 2) Carburetor 101 or Fuel Injection unit 10, 3) Diffuser Chamber 700 with Cone Diffuser 710, 4) the Shell and Tube Heat Exchanger 32, 5) Metal to Metal connection means to compressor housing inlet 330, 6) Draw Through Turbine Heat Exchanger Compressor 300, 7) the Intake Manifold 26 with the internal Heat Exchanger Coil 22 or Sphere 221, 8) Cylinder Head 510, 9) Combustion Chamber. As will be noted, the atmospheric air and liquid gasoline fuel induction occurs prior to the Shell and Tube Heat Exchanger 32, which then converts the air and liquid fuel mixture, using exhaust heat, into a completely dry homogenous gaseous vapor first, and is no longer in liquid form, prior to induction into the Draw Through Turbine Heat Exchanger Compressor unit 300.

Pascal's Principle of Hydraulics dictates that you can compress a gas, but you cannot compress a liquid. Therefore, gasoline in its liquid state cannot be compressed. But, when liquid gasoline is heated, and thereby goes through a phase change by the heat, it is converted into a gaseous state. When emulsified with atmospheric air, also a gaseous compound, the resulting homogenous gaseous air and fuel mixture is compressible. A typical turbocharger unit must be extensively modified to serve a different function and a different set of parameters for using a heated gasoline vapor and atmospheric air mixture. A typical Turbocharger is designed to ingest relatively cool ambient air, from the atmosphere, through an air cleaner assembly, and is not designed to ingest a heated and flammable gasoline and atmospheric air mixture in gaseous form. Therefore a common Turbocharger will not work in its standard configuration, and consequently, must be extensively modified to work with a hot gasoline and air vapor. The standard bearing seals must be replaced with seals using an alternative high heat resistant material, that has the capability of handling the hot gaseous vapor being forced through the compressor housing. Two flanges must also be welded onto the aluminum compressor housing 30, one on the compressor inlet, and one on the compressor outlet nozzle, in order to completely seal off any of the heated combustible gaseous mixture from escaping into the atmosphere. Heated gasoline vapor and atmospheric air mixture is highly volatile and flammable, and any leak could cause an extreme fire hazard. Because of the heat generated on the hot end of the Shell and Tube heat exchanger's 32 metal case 60 (up to 500 degrees Fahrenheit,) appropriate metal flanges must be used. (To defray any confusion, this is not to say that the air and fuel mixture is 500 degrees Fahrenheit, as the temperature of the air and fuel mixture is maintained within the shell and tube heat exchanger at 225 to 300 degrees Fahrenheit, due to the counter cooling effect of the air and fuel mixture flowing through the center of the shell and tube heat exchanger tubes.) A typical, off the shelf "Turbocharger" is designed to utilize silicone type hoses attached with band clamps, which will not work with the amount of heat being generated on the "hot end" of the Shell and Tube Heat Exchanger 32. In testing, high temperature silicone hose was tried, and in a short period of time, became charred and started to disintegrate by heat generated from the Shell and Tube heat exchanger.

Therefore, the induction side of the compressor housing 30, being made of aluminum, must have an aluminum flange welded on that is commensurate in diameter to the Shell and Tube Heat Exchangers metal case 60, so that there can be no restriction to the laminar flow that could be caused by a reduction in the connection size. There is metal to metal contact between the hot end of the Shell and Tube heat exchanger 32 and the aluminum compressor housing 30 inlet orifice, which allows for the conduction and transfer of heat from the hot side of the Shell and Tube heat exchanger 32 to the aluminum compressor housing 30, thereby heating the compressor housing 30, and also continuing the heating of the air and fuel mixture that flows through the compressor housing 30. The Draw through Turbine Heat Exchanger Compressor component 300 must also be securely connected and sealed to the Shell and Tube Heat Exchanger 32 so that no flammable gasoline vapor can escape into the atmosphere. The Shell and Tube heat exchanger 32 must also be supported structurally with a supporting bracket to support the weight of the Shell and Tube heat exchanger 32 plus the weight of the carburetor 10 or fuel injection assembly 101. An exemplary embodiment utilizes Turbocharger "V-Band clamps" and weld on "V-band flanges" for the connections. A supporting bracket is employed and attached to the Shell and Tube heat exchanger's case to support its weight. The Draw through Turbine Heat Exchanger Compressors—Discharge Nozzle 320 must also have a commensurate sized discharge nozzle flange 321 welded on. The Discharge nozzle 320 is connected directly to the intake manifold by a V-Band clamp bracket 322. This V-Band clamp bracket 322 serves as an interface or connecting point between the Draw through Turbine Heat Exchanger Compressors—Discharge Nozzle 320 and the intake manifold 26.

The exhaust side turbine housing 31 and corresponding exhaust turbine impeller assembly 320 must also be reduced in physical dimensions as compared to a standard off the shelf turbocharger. This reduction in the size of the internal passageway allows for a more responsive and concentrated exhaust gas flow over the exhaust side impeller 320. This re-proportioning also allows the Exhaust Turbine 302 to function in a much lower operating range, starting at engine idle. The Draw through Turbine Heat Exchanger Compressor 300 continues the process of heating the gaseous mixture after receiving hot gasoline and atmospheric air vapor from the Shell and Tube style Heat Exchanger 32 in three ways; 1) Heat from the hot exhaust manifold header is transferred from the exhaust side turbine shaft 35 to the compressor side turbine 301 by conduction, heating the compressor turbine blades 310 and also the compressor housing 30, which is in close proximity, then transfers more heat to the to the already heated gaseous air and fuel mixture. 2) The metal to metal connection between the hot Shell and Tube heat exchanger 32 and the aluminum compressor housing inlet orifice 330 also allows for conduction and transfer of heat from the Shell and Tube heat exchanger shell 60 to the compressor housing 30. 3) The act of the compression, in itself, also further heats the gaseous air and fuel mixture. This heating by compression of the gaseous mixture is accomplished on a molecular level. When a gas is compressed, the molecules are packed closer together causing friction between the molecules, and therefore creating heat. The Draw through Turbine Heat Exchanger Compressor 300 is considered to be a "Supercharged" system, and produces a higher level of horsepower and torque in an internal combustion engine as compared to a "naturally aspirated" heat exchanger system.

Exhaust Gas Heat Exchanger Coil/Sphere Components.

Figure 1A:
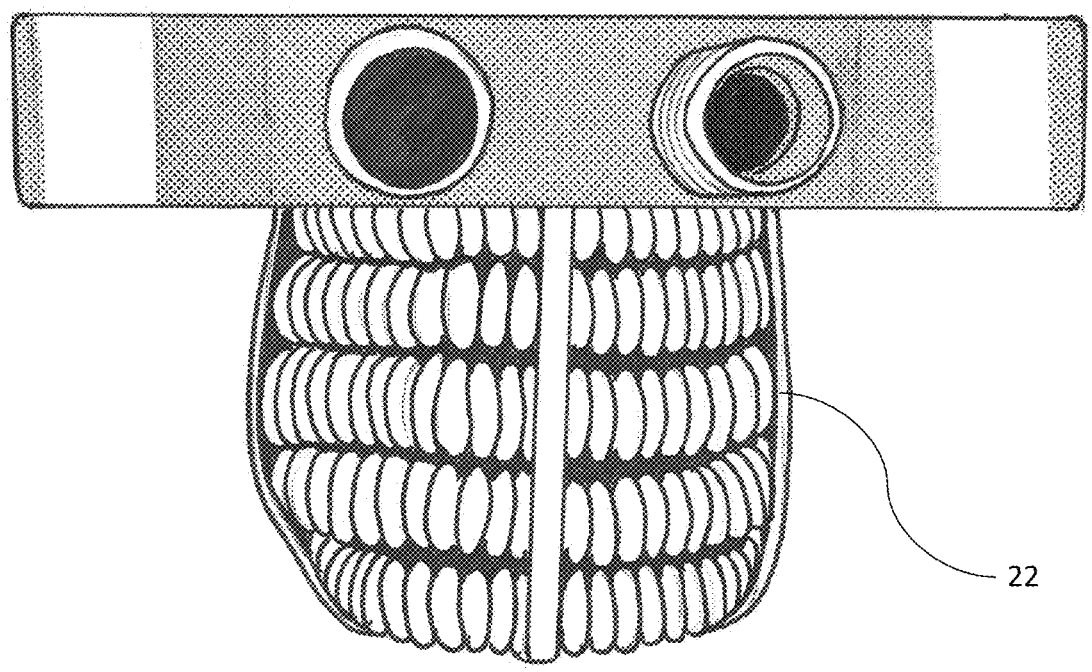
FIG. 1a illustrates is a side view of an exemplary embodiment of the Hot Coil heat exchanger, a component of an embodiment of the present in invention.
Figure 2A:
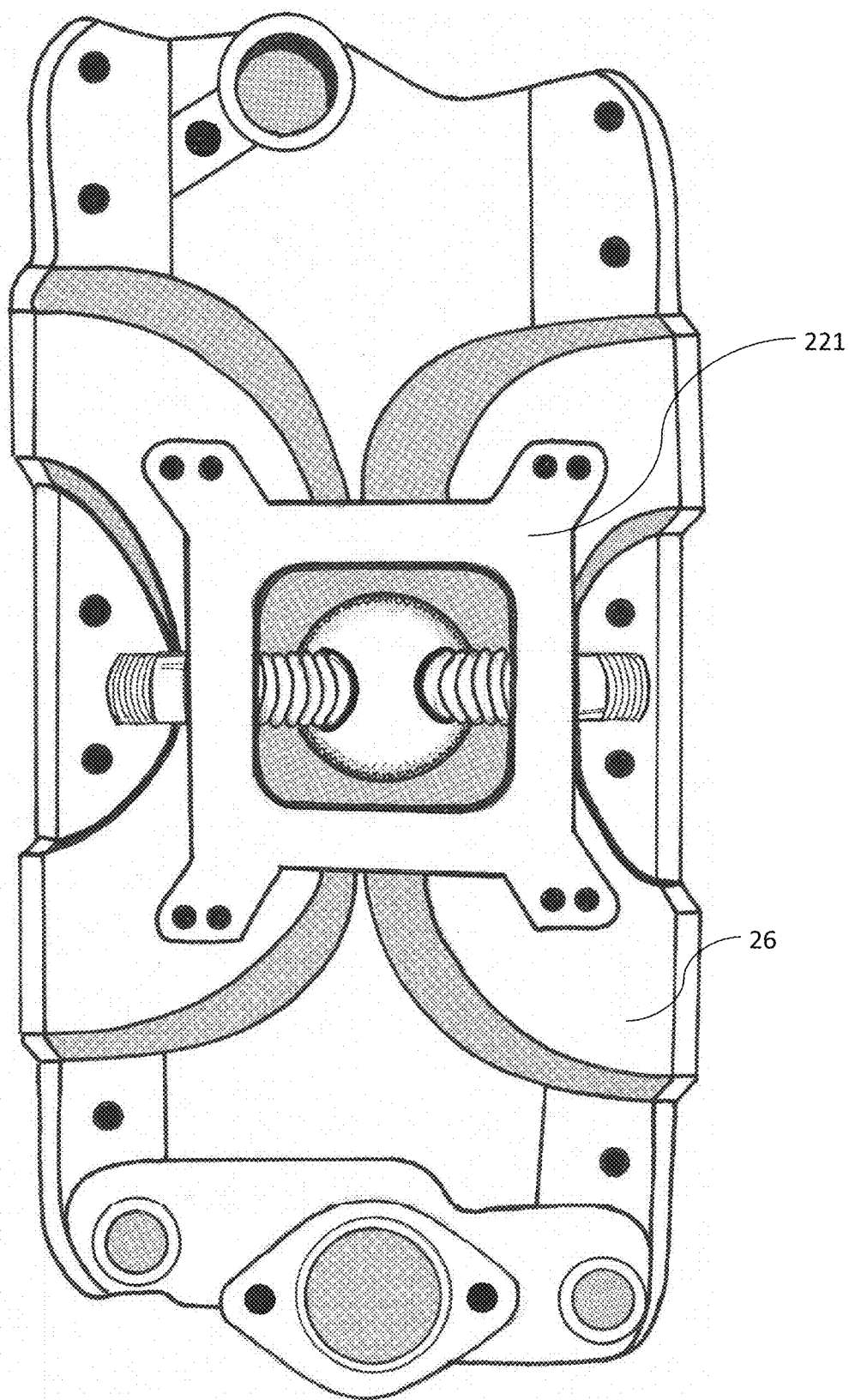
FIG. 2a illustrates an overhead view of an exemplary embodiment of an open plenum intake manifold with the Heat Exchanger Sphere, installed in the open plenum, a component of an embodiment of the present invention.
Figure 2B:
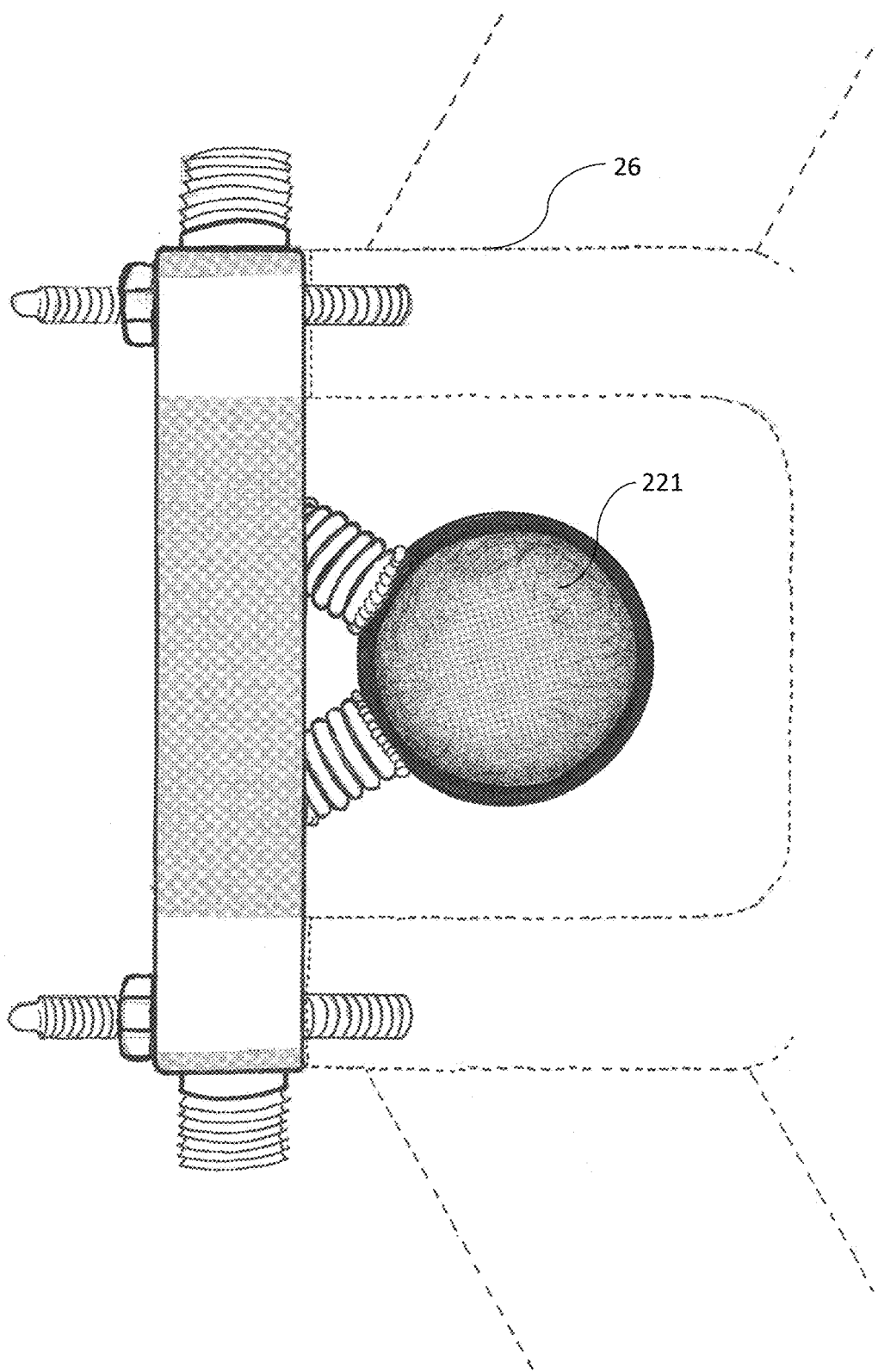
FIG. 2b illustrates is a side view of an exemplary embodiment of the Heat exchanger Sphere, a component of an embodiment of the present invention.
Figure 4:
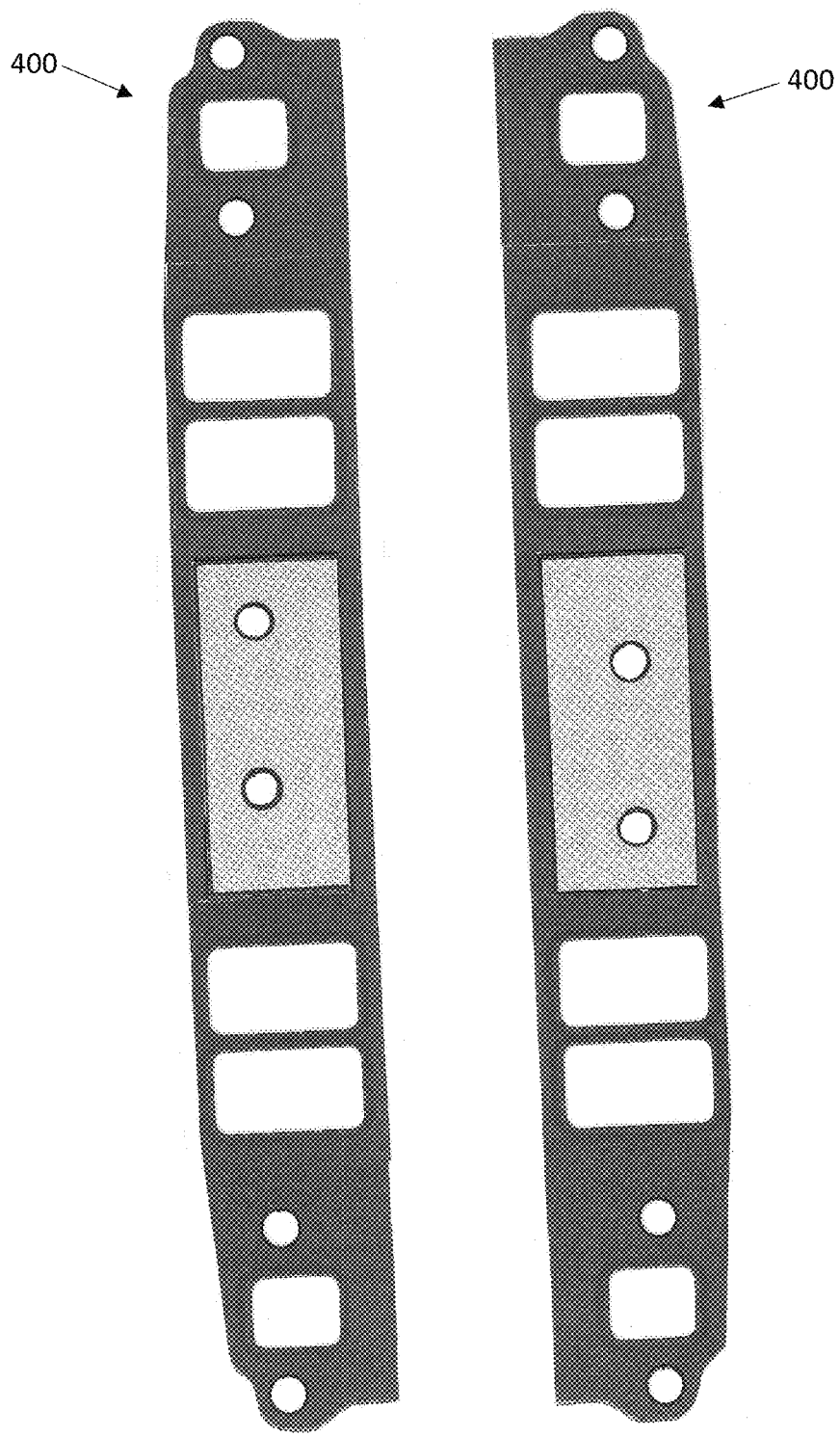
FIG. 4 illustrates two metal intake manifold gaskets, components of an embodiment of the present invention.

The heated gasoline vapor and atmospheric air mixture in gaseous form, continues its progression in route through the intake manifold 26 tract, and then comes into contact with the exhaust gas heated Heat Exchanger Coil 22, or alternatively, with the Heat Exchanger Sphere 221, either of which are positioned inside the intake manifold plenum 26, and which are in close proximity to the cylinder heads intake ports 260. As described herein, the internal Heat exchanger Coil 22 (as shown in FIG. 1 and FIG. 1a) or Heat Exchanger Sphere 221 (as shown in FIG. 2 and FIG. 2a) becomes a third in a series of supplemental heat exchangers for maintaining the heat, which helps to eliminate any gasoline vapor that may start to cool off, condense, and revert back into a liquid form when flowing through the intake manifold 26 and into the engines combustion chamber at high velocity. In a preferred embodiment, intake manifold 26 is an "Open Plenum design," and is constructed from aluminum. Aluminum absorbs heat quickly and radiates heat quickly, and facilitates a transfer of radiant heat to the gasoline and atmospheric air fuel mixture, which flows through the intake manifold 26. Cylinder Heads 510 formed of aluminum are also preferred, because of their ability to transfer heat from combustion chamber heat to the aluminum Intake Manifold 26. Aluminum Cylinder Heads 510 also reduce the occurrence of gasoline vapor pre-ignition or detonation, because of Aluminum's ability for rapid release of retained combustion chamber heat. In addition to the Heat Exchanger Coil 22 or Heat Exchanger Sphere 221, the intake manifold 26 is also heated by herein disclosed Aluminum Intake Manifold Gaskets 400 (see FIG. 4) which allow for the transfer of heat from the cylinder head(s) 510 to the aluminum intake manifold 26. Alternatively, "Aluminum Inserts" may be installed into conventional compressed cardboard intake manifold gaskets, thus forming an alternative embodiment of the herein disclosed aluminum intake manifold gaskets 400.

An embodiment of the present invention is the consistent uniformity of the heating process throughout the three heat exchangers and the intake manifold tract, for complete and through vaporization, homogenization, and pressurization of the gaseous fuel mixture for increasing the density of the gasoline and atmospheric air mixture, all of which facilitates complete combustion of the air and fuel mixture, thereby increasing fuel mileage, increasing engine power output, and a decreasing exhaust emissions.

The Draw Through Turbine Heat Exchanger Control System.

Boost pressure is defined as the amount by which intake manifold pressure exceeds atmospheric pressure. The level of Boost pressure in pounds per square inch must be controlled. To control the Boost level that is emitted from the Draw through Turbine Heat Exchanger compressor 301, a commonly known component called a Waste-gate valve, is employed. The Waste-gate valve is a pneumatically controlled device that opens and closes based on the pressure signal from the intake manifold 26. The Wastegate is held shut by a spring inside the Wastegate housing. The spring has a predetermined pressure rate, (e.g. 4 to 6 psi).

When the boost pressure exceeds the pre-set maximum spring pressure rate, Boost air pressure compresses this spring, progressively opening the Wastegate valve. This allows the exhaust gases from the exhaust manifold to pass through the Wastegate, and bypass the exhaust turbine 302, thereby regulating the exhaust turbine's 302 speed and the boost level. The waste exhaust gasses are then directed into the outflowing exhaust pipe. The boost control of the Draw through Turbine Heat Exchanger Compressor 301 is completely automatic, and no further devices are required.

Heat Expansion.

The cool atomized gasoline, which has been emulsified with atmospheric air, through the carburetor's "Venturi" is then heated as it flows through the Shell and Tube Heat Exchanger 32, which causes a phase change into a true gaseous form. When heated, the gaseous mixture expands significantly. If the air and fuel mixture is uniformly heated to 250 degrees Fahrenheit, the gaseous mixture will expand up to eighty times by volume. Auto-ignition temperature is the temperature at which the vapor ignites by heat (spontaneous combustion) without an ignition source, such as a spark from a sparkplug. The auto-ignition temperature of gasoline in a liquid form is from 495-536 degrees Fahrenheit. If auto-ignition of gasoline vapor were to occur at the wrong time or place inside the engine, it could detonate and damage the internal components of that engine. Therefore, the target vaporization temperature for the heated air and gasoline mixture in gaseous form, in the described heat exchanger system(s) is 225 to 300 degrees Fahrenheit, and is well under the auto-ignition temperature. When the air and fuel mixture is heated, phase change is initiated and expansion occurs, which makes the air and fuel mixture much less dense. Consequently, the heated air and gasoline mixture in gaseous form is thinned out. This less dense mixture also means that there would be a lesser quantity of air and fuel inducted into the combustion chamber when a naturally aspirated heat exchanger system is being utilized. Therefore, less gasoline will be consumed and also less engine power will be produced. This is akin to driving an automobile in the mountains at a high altitude, where the air is thinner and therefore less power is produced. Some compensation for this situation is helped by the fact that, by the gasification process, nearly 100% of the thinner gaseous air and gasoline mixture is consumed by the internal combustion engine. To greatly increase the power output of the engine, when running on a gaseous air and gasoline vapor mixture, two alternative methods may be employed. The Draw through Turbine Heat Exchanger 300 can be used to increase the density of the air and fuel charge by artificial pressurization. By packing more of the thinned gasoline vapor and air mixture into the combustion chamber under pressure, significant power increases will be achieved. The second method for increasing the fuel density requires increasing the static compression ratio of the internal combustion engine, by installing higher compression domed pistons. Installing domed pistons at cylinder heads 510 increases the static compression ratio of the engine because the piston's dome takes up more physical space within the combustion chamber, which then can compress the air and fuel mixture into a smaller physical space thus increasing the rate of compression and the density of the air and fuel mixture within the combustion chamber. Increasing the density of the air and fuel vapor mixture using either or both methods simultaneously will increase the power output and the efficiency of the internal combustion engine within mechanical limits.

Camshaft Profile.

Original Equipment Manufactures (O.E.M.) utilize camshaft profiles that are engineered to have an "Overlap" of the camshaft timing events. Engineered "Overlap" occurs at the end of the engine's exhaust stroke, when the piston is very near top dead center position, the exhaust valve is closing, but is not fully closed yet, the intake valve then starts to open, allowing the air and fuel mixture to enter the combustion chamber. There is then residual hot exhaust gas and heat, still in the chamber, that has not been totally evacuated. The combustion chamber is extremely hot because it has just completed the combustion process of the power stroke. The incoming emulsified liquid gasoline and air charge mixes with the residual hot exhaust gas, and this mixing and exposure to heat contributes to the vaporization the atomized gasoline mixture. Engineered overlap is not conducive to increasing the efficiency, fuel mileage and reduction of exhaust emissions of a gasoline fueled internal combustion engine. When the intake and exhaust valves are open simultaneously, some of the incoming pre-combustion air and fuel mixture will flow out of the combustion chamber and into the exhaust system, thereby wasting fuel. Therefore the herein described Three Stage Gasoline Vapor System utilizes a specially designed camshaft profile which does not employ Engineered Camshaft Overlap profile, as the air and gasoline mixture is completely vaporized prior to flowing into the combustion chamber.

Temperature Controls.

The temperature of the air and gasoline vapor mixture must be controlled, so that it does not get too hot. The air and gasoline vapor system must stay within the working parameters of the system. If the air and gasoline mixture were to reach an auto ignition temperature of 495 degrees Fahrenheit, spontaneous combustion and therefore detonation would occur. Detonation can damage internal engine components, and therefore a safeguard must be implemented. The system employs a device that diverts a large portion of the hot exhaust gasses prior to entering the primary Shell and Tube Heat Exchanger 32. When the air and gasoline mixture exceeds the desired temperature, a Diverter Valve is opened, and the hot exhaust gasses are diverted around the Shell and Tube heat exchanger 32 and back into the rear exhaust system. Therefore a large portion of the exhaust gasses do not enter the heat exchanger which then changes the ratio of the cool emulsified air and fuel mixture flowing through the heat exchanger versus the hot exhaust gasses heating the heat exchanger. The cool versus hot temperatures constantly counteract each other. The temperature of the Shell and Tube heat exchanger 32 will then be reduced, and therefore the heating of the air and gasoline mixture will be reduced until it reaches acceptable and safe temperature parameters. There may be a dash-mounted pyrometer that allows the operator to monitor temperature of the air and gasoline vapor mixture via a temperature probe inside the intake manifold. The Temperature Control Diverter Valve system can be operated manually using a dash mounted cable, or by an optional thermostatically controlled module that controls the Diverter Valve. The optional thermostatic control module for the diverter valve is completely automatic.

Shut Down Procedure for Carbureted Engines.

When using a carburetor, with the herein disclosed gasoline vapor system, a specialized shut down procedure may be employed (and in a preferred embodiment, this specialized shut down procedure should be utilized). This special procedure does not apply to fuel injected gasoline vapor systems. A heated gasoline and atmospheric air mixture in gaseous form is much more volatile than the usual emulsified liquid gasoline and atmospheric air mixture. This is because liquid gasolines will not combust in liquid form, but will only combust in a gaseous form. When a common internal combustion engine is shut down, at least one of the engines cylinders will have an intake valve left open in the four stroke cycle. In all cases this open valve leaves open access to the hot combustion chamber, which has just gone through the combustion process with extremely high combustion temperatures. The un-combusted heated gasoline/air vapor mixture in gaseous form, which has contact with the hot combustion chamber, could auto ignite and detonate the gaseous vapor inside the intake manifold 26 tract, after the carburetor supplied engine has been electrically shut off. Spontaneous combustion detonation of gaseous vapor in the combustion chamber and intake manifold 26, after the engine is shut off could cause internal physical damage to the engine. When using a carburetor, with the disclosed gasoline vapor system, gasoline is supplied to the carburetor by a low pressure electric fuel pump. To eliminate the detonation problem, the supply of gasoline from the fuel pump to the carburetor is electrically shut off by an on/off switch, and the engine is allowed to continue running until all air and gasoline vapor that is inside the intake manifold tract and the carburetor's fuel bowl is consumed by the running engine. The engine will then simply stop, and no detonation can occur because all volatile air and gasoline vapor in the intake manifold tract has been consumed. The engine simply runs out of gas. An optional automated electronic module is available to serve this function. This procedure is not necessary with throttle body fuel injected systems because all fuel is shut off to the injectors electronically, and therefore all fuel induction is completely shut off so that the engine cannot continue running on and detonate.

The herein disclosed gasoline vaporization system may also be described as a method for providing fuel to an engine in a vaporized condition, comprising the steps of: step 100 atomizing and emulsifying liquid gasoline with atmospheric air to form a mixture; step 200 receiving exhaust heat from the engines combustion chamber and directing the exhaust heat through an exhaust gas heat exchanger, then through a draw through turbine heat exchanger compressor to compress the expanded air and fuel mixture; step 300 receiving exhaust gas from the engines combustion chambers to power the draw through turbine heat exchanger compressors turbines, and through an exhaust gas heat exchanger coil or alternative heat exchanger sphere, positioned within an intake manifold; step 400 transferring the exhaust heat to the air and gasoline mixture through the exhaust gas heat exchanger and thereby converting the mixture into a gaseous fuel vapor; step 500 directing the gaseous fuel vapor through the draw through turbine heat exchanger compressor to increase a density of the gaseous fuel vapor; step 600 directing the gaseous fuel vapor into the intake manifold; step 700 transferring the exhaust heat to the gaseous fuel vapor with the exhaust gas heat exchanger coil or alternative heat exchanger sphere; step 800 receiving cylinder head heat through one or more metallic intake manifold gaskets from one or more cylinders of the engine, and transferring the cylinder head heat to the gaseous fuel vapor within the intake manifold; step 900 directing the gaseous fuel vapor through one or more engine valve controlled cylinder head intake ports and into one or more engine combustion chambers. See FIG. 20 illustrating a preferred embodiment of the herein disclosed methods for providing fuel to an engine in a vaporized condition.

While the present invention has been illustrated and described herein in terms of a preferred embodiment and several alternatives, it is to be understood that the systems and methods described herein can have a multitude of additional uses and applications. Accordingly, the invention should not be limited to just the particular description and various drawing figures contained in this specification that merely illustrate a preferred embodiment and application of the principles of the invention.

What is claimed is:

1. A system for providing fuel to an engine in a vaporized condition, comprising: a first stage module for atomizing and emulsifying liquid gasoline with atmospheric air to form a mixture, and for converting the mixture into a gaseous fuel vapor, wherein the first stage module includes an air and fuel introduction apparatus positioned in a straight-line flow path into an exhaust gas heat exchanger, and wherein the exhaust gas heat exchanger receives exhaust heat from the engine and transfers the exhaust gas heat to the mixture, in which the exhaust gas heat exchanger is a shell and tube style heat exchanger and includes a plurality of spirally corrugated metal tubes providing a plurality of straight through flow passages for the mixture to flow through; a second stage module for increasing heat and density of the gaseous fuel vapor and pressurizing an intake manifold tract, wherein the second stage module includes a draw through turbine heat exchanger compressor; and a third stage module for imparting the exhaust gas heat to the gaseous fuel vapor and for imparting cylinder head heat to the gaseous fuel vapor, wherein the third stage module includes an internal sphere shaped heat exchanger positioned within an intake manifold, and one or more metal intake manifold gaskets positioned between the intake manifold and one or more cylinder heads, and wherein combustion heat that has been absorbed by the cylinder head, is transferred by conduction through metallic intake manifold gaskets to the metallic intake manifold, continuing the heating process and maintaining a consistent and uniform hot temperature of the gasoline vapor, by heating the gasoline vapor mixture both internally and externally until it enters the engines combustion chamber.

2. The system as recited in claim 1, wherein the intake manifold is a metal open plenum style intake manifold.

3. The system as recited in claim 1, wherein the first stage module further includes a diffuser chamber, and wherein the carburetors or alternative fuel injection unit is mounted to the diffuser chamber with a non-heat conductive silicone elastomer attachment means and connection conduit.

4. The system as recited in claim 3, wherein the diffuser chamber may include an internal cone diffuser member for equally distributing the mixture into the exhaust gas heat exchanger.

5. A method for providing fuel to an engine in a vaporized condition, comprising the steps of: atomizing and emulsifying liquid gasoline with atmospheric air to form a mixture; receiving exhaust heat from the engines combustion chamber and directing the exhaust heat through an exhaust gas heat exchanger, in which the exhaust gas heat exchanger is a shell and tube style heat exchanger and includes a plurality of spirally corrugated metal tubes providing a plurality of straight through flow passages for the mixture to flow through, then directing the mixture through a draw through turbine heat exchanger compressor to compress the expanded air and fuel mixture; to receive exhaust gas from the engines combustion chambers to power the draw through turbine heat exchanger compressor turbines, and through an exhaust gas heat exchanger coil or alternative heat exchanger sphere, positioned within an intake manifold; transferring the exhaust heat to the air and gasoline mixture through the exhaust gas heat exchanger and thereby converting the mixture into a gaseous fuel vapor; directing the gaseous fuel vapor through the draw through turbine heat exchanger compressor to increase a density of the gaseous fuel vapor; directing the gaseous fuel vapor into the intake manifold; transferring the exhaust heat to the gaseous fuel vapor with the exhaust gas heat exchanger coil or alternative heat exchanger sphere; receiving cylinder head heat through one or more metallic intake manifold gaskets from one or more cylinders of the engine, and transferring the cylinder head heat to the gaseous fuel vapor within the intake manifold; directing the gaseous fuel vapor through one or more engine valve controlled cylinder head intake ports and into one or more engine combustion chambers.

6. The method as recited in claim 5, wherein the step of atomizing and emulsifying liquid gasoline with atmospheric air to form a mixture is carried out by a fuel injection unit, and wherein the exhaust gas heat exchanger is positioned in a straight-line flow path with the fuel injection unit.

7. The method as recited in claim 5, wherein the step of atomizing and emulsifying liquid gasoline with atmospheric air to form a mixture is carried out by a carburetor or fuel injection unit, and wherein the exhaust gas heat exchanger is positioned in a straight-line flow path with the carburetor or fuel injection unit.

8. The method as recited in claim 7, further comprising the steps of: electrically shutting off a supply of gasoline to the carburetor; and allowing the engine to continue running until substantially all the gaseous fuel vapor located inside the carburetor and the intake manifold is consumed.

* * * * *